US007988076B2

(12) United States Patent
Mamo

(10) Patent No.: US 7,988,076 B2
(45) Date of Patent: Aug. 2, 2011

(54) NON-CLOGGING NON-PRESSURE COMPENSATED DRIP EMITTER

(75) Inventor: Shay Mamo, La Jolla, CA (US)

(73) Assignee: D.R.T.S. Enterprises Ltd., San Diego, CA (US)

( * ) Notice: Subject to any disclaimer, the term of this patent is extended or adjusted under 35 U.S.C. 154(b) by 227 days.

(21) Appl. No.: 12/254,761

(22) Filed: Oct. 20, 2008

(65) Prior Publication Data

US 2010/0096478 A1   Apr. 22, 2010

(51) Int. Cl.
*B05B 15/00* (2006.01)
(52) U.S. Cl. .................. 239/542; 239/547; 239/533.1; 239/570
(58) Field of Classification Search .......... 239/542, 239/547, 533.13, 533.1, 570
See application file for complete search history.

(56) References Cited

U.S. PATENT DOCUMENTS

| | | | |
|---|---|---|---|
| 3,856,333 A | 12/1974 | Cox | |
| 3,896,999 A * | 7/1975 | Barragan | 239/107 |
| 3,981,452 A | 9/1976 | Exkstein | |
| 4,210,287 A | 7/1980 | Mehoudar | |
| 4,687,143 A | 8/1987 | Gorney et al. | |
| 4,824,025 A | 4/1989 | Miller | |
| 5,200,132 A | 4/1993 | Shfaram et al. | |
| 5,203,503 A | 4/1993 | Cohen | |
| 5,330,107 A | 7/1994 | Karathanos | |
| 5,531,381 A | 7/1996 | Ruttenberg | |
| 5,586,727 A | 12/1996 | Shekalim | |
| 5,615,838 A | 4/1997 | Eckstein et al. | |
| 5,636,797 A | 6/1997 | Cohen | |
| 5,641,113 A | 6/1997 | Somaki et al. | |
| 5,829,685 A * | 11/1998 | Cohen | 239/533.1 |
| 5,829,686 A * | 11/1998 | Cohen | 239/533.1 |
| 6,027,048 A | 2/2000 | Mehoudar | |
| 6,206,305 B1 | 3/2001 | Mehoudar | |
| 6,403,013 B1 | 6/2002 | Man | |
| 6,464,152 B1 | 10/2002 | Bolinis et al. | |
| 6,568,607 B2 | 5/2003 | Boswell et al. | |
| 6,817,548 B2 * | 11/2004 | Krauth | 239/542 |
| 7,108,205 B1 * | 9/2006 | Hashimshony et al. | 239/542 |

(Continued)

FOREIGN PATENT DOCUMENTS

IT        1255120        4/1992

(Continued)

OTHER PUBLICATIONS

International Search Report and Written Opinion for PCT Application No. PCT/US09/61090, dated Jan. 13, 2010, 8 pages.
International Search Report for child application, dated Aug. 5, 2010.

*Primary Examiner* — Dinh Nguyen
(74) *Attorney, Agent, or Firm* — ARC IP Law, PC; Joseph J. Mayo

(57) ABSTRACT

A non-clogging non-pressure compensated drip emitter that utilizes one or more filters or one or more inwardly offset filters that have an inlet that projects inwardly toward a centerline of the hollow cylindrical emitter body and a labyrinth having only turbulent transfer zones after water enters the labyrinth, wherein the labyrinth couples the filter(s) or inwardly offset filter(s) to the pool. Prevents clogging by eliminating dead transfer zones where sediment can accumulate where no turbulence exists. Also prevents clogging when the filter is positioned downward as the inwardly offset filter rises above any sediment when the emitter is positioned in the field in this downward orientation. Also prevents clogging flat filter configurations that have filters offset radially, i.e., redundant filters per emitter.

8 Claims, 28 Drawing Sheets

| U.S. PATENT DOCUMENTS | | | | FOREIGN PATENT DOCUMENTS | | |
|---|---|---|---|---|---|---|
| 2002/0064935 A1 | 5/2002 | Honda | | JP | 2000 228417 | 8/2000 |
| 2005/0224962 A1 | 10/2005 | Akamatsu et al. | | WO | WO 02/15670 | 2/2002 |
| 2006/0163388 A1 | 7/2006 | Mari | | WO | 2006/038246 | 4/2006 |
| 2006/0255186 A1 | 11/2006 | Ruskin | | | | |

* cited by examiner

NON-CLOGGING NON-PRESSURE COMPENSATED DRIP EMITTER

BACKGROUND OF THE INVENTION

1. Field of the Invention

Embodiments of the invention described herein pertain to the field of irrigation apparatus. More particularly, but not by way of limitation, one or more embodiments of the invention enable a non-clogging non-pressure compensated drip emitter.

2. Description of the Related Art

There are multiple types of irrigation drippers. Simple drippers exist that are inserted serially along pipe, either by forcing a hole into the pipe and placing the dripper on the outside of the pipe, or by cutting the pipe and inserting the dripper in line with the pipe. These systems require great amounts of labor when providing a watering system for a large agricultural area for example.

Other types of drippers include drip emitters that are inserted into pipe, generally when the pipe is extruded. This type of dripper system enables rapid deployment of great lengths of pipe, i.e., dripper line, wherein the drippers may be ordered for certain distances along the pipe for example. There are may types of emitters that may be inserted into the pipe including non-pressure compensated drippers that may provide more flow in lower areas of an agricultural drip irrigated area. Other types of emitters include pressure compensated drip emitters that provide compensated drip volumes regardless of the depth or height or pressure difference in an agricultural drip irrigated area.

Currently known drip emitters may clog over time for a variety of reasons. Many of the reasons for clogging in currently known drip emitters are related to or a result of non-turbulent pathways, i.e., laminar transfer zones or any path of water flow that is straight enough to allow sediment to settle. For example, between the inner portion of the emitter to the pool area of the emitter, if a transfer zone is formed as a straight line, for example across a mold joint, sediment accumulates in the non-turbulent zone over time and eventually forms a clog as sediment settles.

In addition, drip emitters include a filter tend to clog when the emitter is rotated so as to locate the filter downward wherein sediment settles, which clogs the filter. In addition, emitters that utilize only one hole may clog if covered by soil for a rock for example. In these situations, a second hole is not utilized to provide a level of redundancy.

For at least the limitations described above there is a need for a non-clogging non-pressure compensated drip emitter.

BRIEF SUMMARY OF THE INVENTION

One or more embodiments of the invention enable a non-clogging non-pressure compensated drip emitter. Embodiments include a hollow cylindrical emitter body having an inner cylindrical surface, an outer cylindrical surface, a first end and a second end. Embodiments may be constructed as a full cylinder or an arc of a full cylinder. Embodiments further include a filter or an inwardly offset filter that projects inwardly from the inner cylindrical surface of the hollow cylindrical emitter body. The filter does not clog when the emitter oriented rotationally downward in the field as the filter is not a potential well and hence sediment does not drop into it. In addition, the filter provides a snorkel effect that enables faster moving and cleaner water to enter the emitter via the filter, hence eliminating the potential to clog in a second manner. Thus the filter eliminates clogs in two ways, by avoiding sediment with a height offset and avoiding sediment by selecting faster moving water away from the pipe outer surface. An emitter may also utilize more than one filter in a redundant configuration to either supply both pools on each side of the emitter or alternatively to supply an associated pool in a one-to-one manner.

Embodiments further include a pool coupled with the outer cylindrical surface wherein the pool is configured to hold water filtered by the filter or inwardly offset filter when the hollow cylindrical emitter body is enclosed in a pipe. Embodiments further include a labyrinth coupled with the outer cylindrical surface wherein the labyrinth includes only turbulent transfer zones, at least after water enters the labyrinth, and wherein the labyrinth allows the water to flow from the filter or inwardly offset filter to the pool. Through the use of only turbulent transfer zones once the water enters the labyrinth, sediment is continuously forced through the labyrinth and has no location to settle and hence the labyrinth minimizes the potential to clog. In other words, laminar flow transfer zones are not utilized as these type of "straight" paths tend to clog over time with sediments. By utilizing a filter or an inwardly offset filter and a labyrinth that includes only turbulent transfer zones, the emitter minimizes the potential to clog in multiple ways.

Once an embodiment of the emitter is enclosed in a pipe, the pool is thus sealed, for example via a wall at one end of the emitter and a side of the labyrinth, for example when the labyrinth extends outwardly from the outer cylindrical surface of the emitter. The pool is tapped via one or more hole(s) in the enclosing pipe to allow for the water running in the inner portion of the pipe and inner portion of the emitter to flow through the filter and labyrinth to the pool and out the hole at a rate that is controlled by the particular shape and size of the labyrinth for example.

One or more embodiments of the invention provide an elongated filter that is aligned lengthwise along the axis of the cylinder forming the emitter, for example lengthwise parallel along the axis of the cylinder of the emitter. Embodiments may also limit the width of the filter to be less than the width of the emitter and for example may avoid positioning the filter directly under a pool. The filter inward offset can be any depth and the ends of the filter can be angled to provide for a more streamlined flow of water past the filter for example.

In one or more embodiment of the invention, a symmetrical embodiment may be utilized that provides two pools and two labyrinths. This embodiment provides a robust redundant embodiment that continues to work even if one labyrinth were to clog, or if one hole into the pipe associated with a particular emitter were to be externally plugged, buried or blocked. Several embodiments of redundant configurations may be formed that include a two pool embodiment with one or more labyrinths, i.e., one labyrinth with a "T" or fork section, or two labyrinths, each flowing to a separate pool. Alternatively, the embodiment can be doubled to form more than one filter or inwardly offset filter, for example offset rotationally by 180 degrees, with separate labyrinth(s) and pool(s) coupled therewith for even more redundancy.

The labyrinth may be coupled with the emitter by forming the emitter via injection molding so that the labyrinth extends outwardly from the outer cylindrical surface of the emitter. In this embodiment, water is sealed on the bottom by the outer cylindrical surface or floor of the labyrinth, and is further sealed by the outwardly extending walls of the turbulent zones for example. In addition, water is sealed by the inner surface of the enclosing pipe into which the emitter is placed. The exit from the labyrinth allows water to flow into the pool(s).

Injection molding of embodiments of the invention that avoids a straight water flow path by avoiding crossing mold junctions enables the elimination of non-turbulent transfer zones so long as bends in the labyrinth are also formed with turbulent providing features.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION

A non-clogging non-pressure compensated drip emitter will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
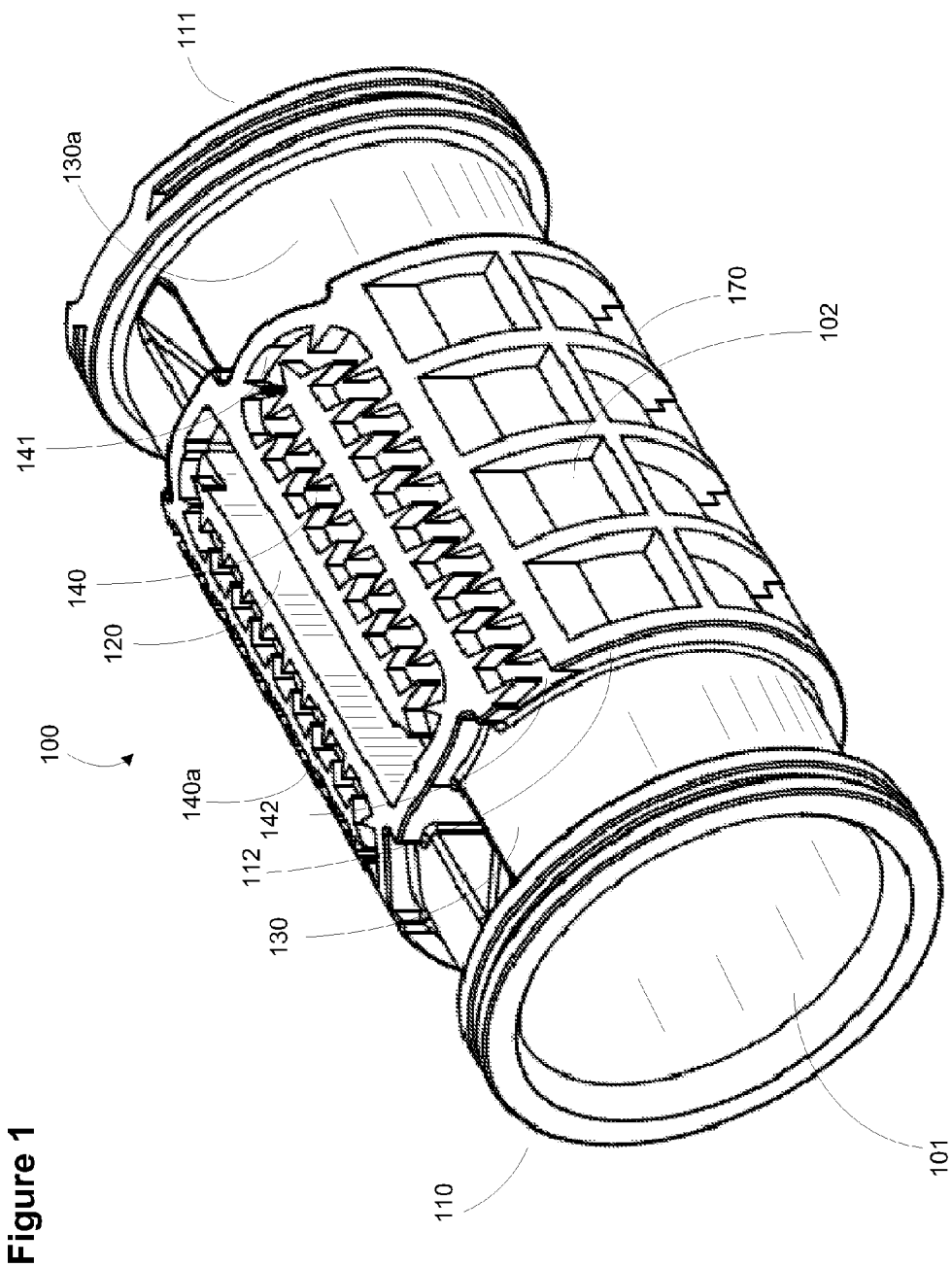
FIG. 1 is a perspective view of an embodiment of the non-clogging non-pressure compensated drip emitter.

FIG. 1 is a perspective view of an embodiment of non-clogging non-pressure compensated drip emitter 100. Embodiments include a hollow cylindrical emitter body having inner cylindrical surface 101, outer cylindrical surface 102 that forms the floor of the emitter working elements, first end 110 and second end 111. The emitter of FIG. 1 is inserted into a pipe or hose as is shown as a shaded tube in FIG. 2 wherein holes are created in the hose to allow water flowing from the inside of the pipe, and hence inside of inner cylindrical surface 101 through inwardly offset filter 120, through labyrinth 140 (to labyrinth exit 142 for example) and 104a and into pools 130 and 130a respectively and out of holes 202 and 202a respectively.

Referring to FIG. 1, embodiments utilize inwardly offset filter 120 that projects inwardly from the inner cylindrical surface of the hollow cylindrical emitter body. The filter does not clog when the emitter oriented rotationally downward in the field as the filter is not a potential well and hence sediment does not drop into it. In addition, the filter provides a snorkel effect that enables faster moving and cleaner water to enter the emitter via the filter, hence eliminating the potential to clog. Thus the filter eliminates clogs in two ways. For example when the enclosing pipe is place in an agricultural area, the pipe may rotate to an orientation that places inwardly offset filter 120 on the lowest point (see FIG. 4 for this orientation).

Figure 2:
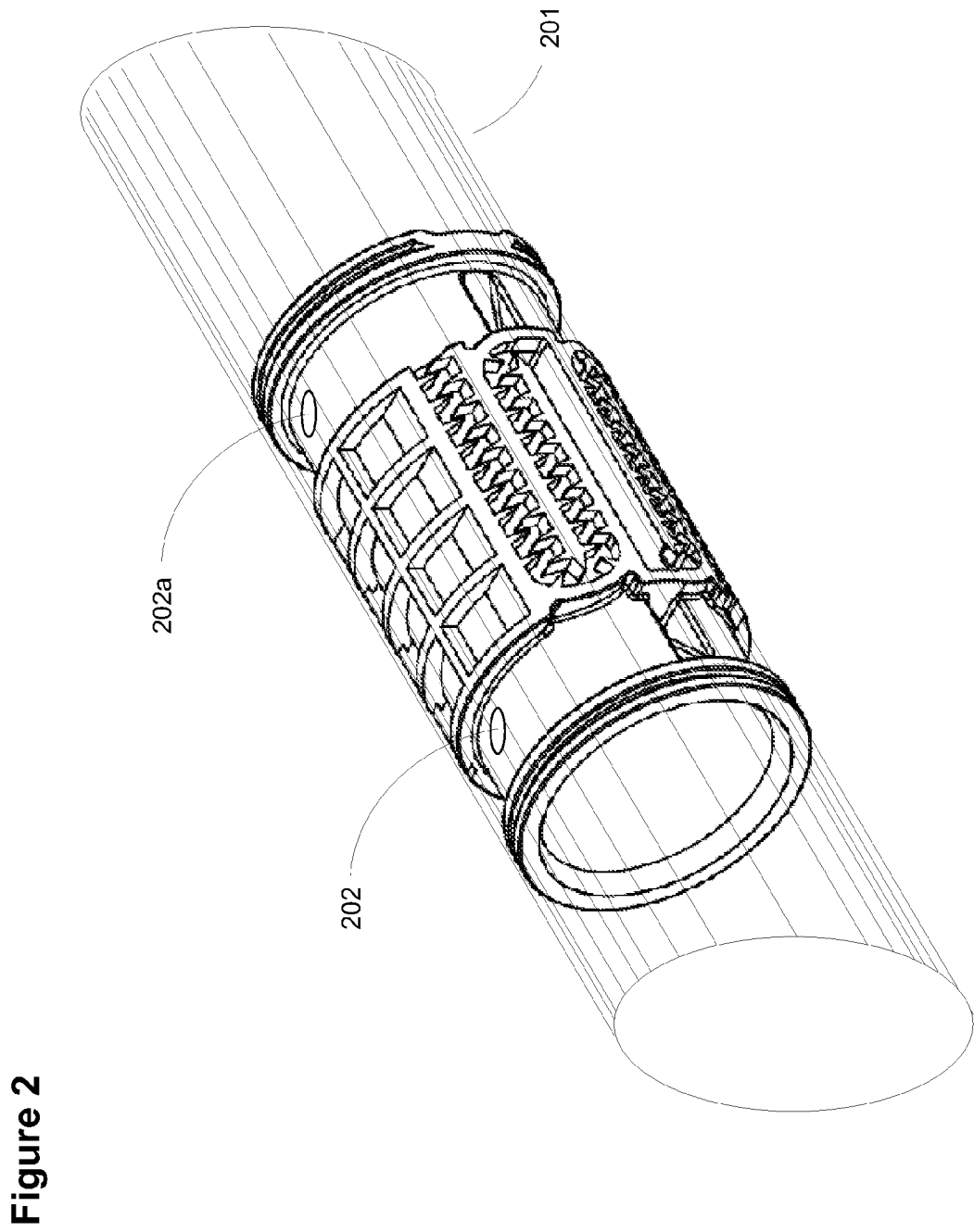
FIG. 2 is a perspective view of an embodiment of the non-clogging non-pressure compensated drip emitter rotated 90 degrees about the lengthwise axis of the emitter and shown as situated inside a pipe or hose.
Figure 3:
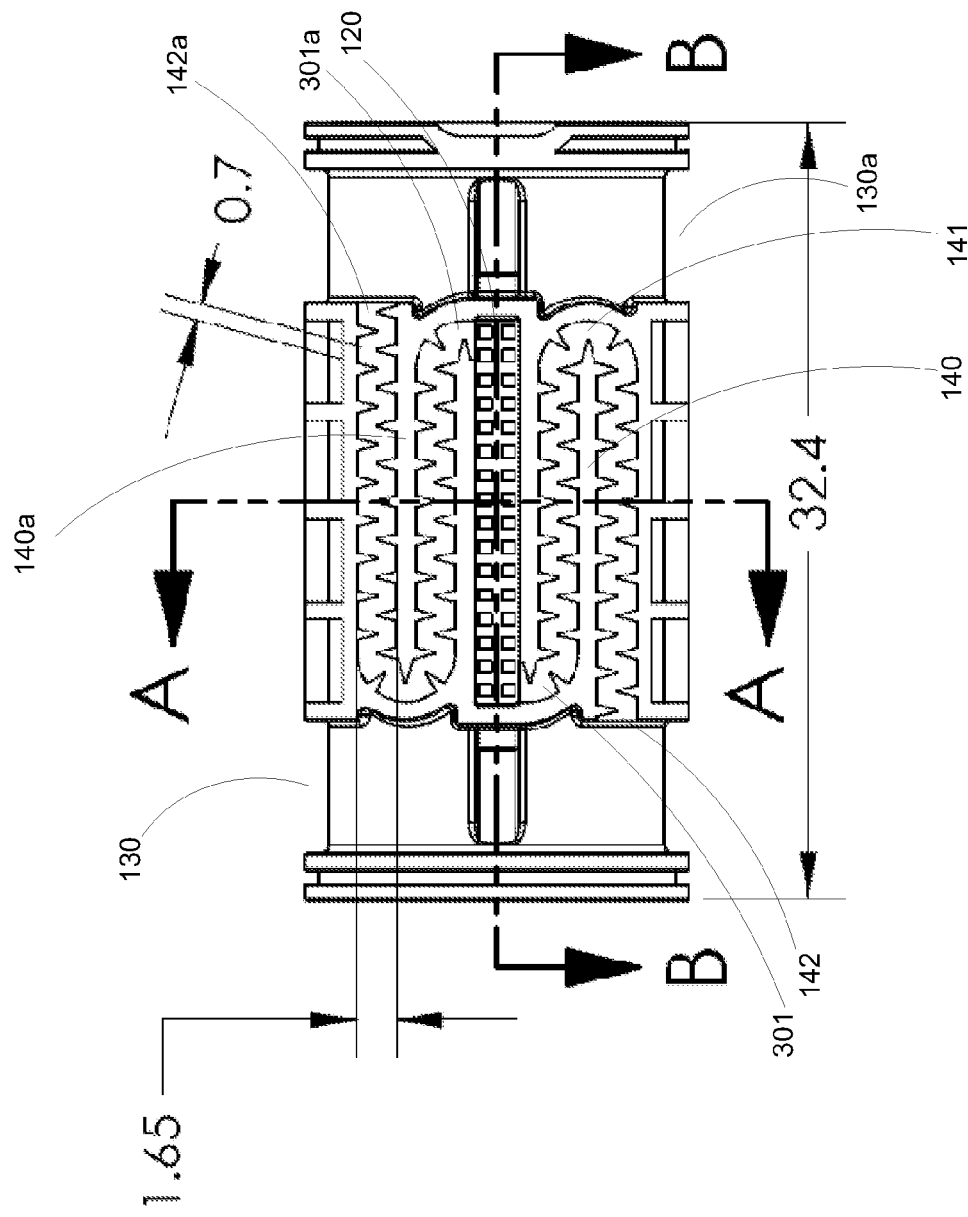
FIG. 3 is a top view of an embodiment of the non-clogging non-pressure compensated drip emitter.

Embodiments provide pool 130 formed at the deepest offset by outer cylindrical surface 102, wherein pool 130 is configured to hold water filtered by inwardly offset filter 120. Embodiments further include labyrinth 140 coupled with the outer cylindrical surface wherein labyrinth 140 includes only turbulent transfer zones once water enters the labyrinth and wherein labyrinth 140 allows the water to flow from inwardly offset filter 120 to pool 130. Through the use of only turbulent transfer zones, sediment is continuously forced through the labyrinth and has no location to settle and hence the labyrinth minimizes the potential to clog. By utilizing inwardly offset filter 120 and labyrinth 140 that includes only turbulent transfer zones, the emitter minimizes the potential to clog in multiple ways. As shown in FIGS. 1-3, labyrinth 140 includes teeth that point inwardly into the path of water flow, wherein the teeth disrupt the flow of water through labyrinth 140 and provide turbulent transfer zones throughout labyrinth 140. Any shape may be utilized to create turbulent transfer zones, including but not limited to teeth, or any other geometric shape such as square waves, saw tooth shapes, or any other shape that provides for non-linear or non-laminar water flow. For example, the bend in labyrinth 140 on the right side of the emitter includes a pair of teeth pointing inwardly to the left and a tooth pointing toward the right that extends from the dividing wall between the two parallel sections of labyrinth 140 toward the pair of teeth at transfer zone location 141. Transfer zone location 141 is thus configured to be a turbulent transfer zone that does not allow water to linearly flow and hence does not allow sediment to settle.

Once an embodiment of the emitter is enclosed in a pipe, pool 130 is thus sealed, for example via the wall at first end 110 of the emitter and side 112 of the labyrinth/filter section. The "depth" of the pool 130 may be any depth that allows for the desired amount of water to flow through the particular embodiment. For example, when labyrinth 140 extends outwardly from the outer cylindrical surface of the emitter by a desired distance, this distance sets the depth of the path of the water through the labyrinth. By configuring the labyrinth with the desired number of turbulent features, for example teeth and setting the width of the water path through the labyrinth, any water flow amount can be easily configured for the desired product implementation. Pool 130 is tapped via hole 202 in the enclosing pipe to allow for the water running in the inner portion of the pipe and inner portion of the emitter to flow through inwardly offset filter 120 and labyrinth 140 to pool 130 and out hole 202. In other words, the rate of water flow is controlled by the particular shape and size of the labyrinth for example the length, cross-sectional area, number of teeth, length of teeth of the turbulent zones. Grid 170 is formed to minimize the amount of plastic for example utilized in each emitter, and provides a higher coefficient of static friction between the enclosing pipe and is optional in that it does not form a part of the water flow mechanism of embodiments of the invention.

One or more embodiments of the invention provide an elongated filter as shown in FIGS. 1-3, that is aligned lengthwise along the axis of the cylinder forming the emitter, for example lengthwise parallel along the axis of the cylinder of the emitter. Embodiments may also limit the width of the filter to be less than the width of the emitter and for example may avoid positioning the filter directly under a pool. The filter inward offset can be any depth greater than 0 mm and the ends of the filter can be angled to provide for a more streamlined flow of water past the filter for example to aid in the snorkel effect of taking in faster moving water.

In one or more embodiment of the invention, a symmetrical embodiment may be utilized that provides two pools, i.e., 130, 130*a* and two labyrinths 140, 140*a*. This embodiment provides a robust redundant embodiment that continues to work even if one labyrinth were to clog, or if one hole into the pipe associated with a particular emitter were to be externally plugged, buried or blocked. The labyrinth may be coupled with the emitter by forming the emitter via injection molding so that the labyrinth extends outwardly from the outer cylindrical surface of the emitter. In this embodiment, water is sealed on the bottom by the outer cylindrical surface of the emitter, i.e., the floor of the labyrinth, and is further sealed by the outwardly extending walls of the turbulent zones for example. In addition, water is sealed by the inner surface of the enclosing pipe into which the emitter is placed. The exit from the labyrinth allows water to flow into the pool.

FIG. 2 is a perspective view of an embodiment of the non-clogging non-pressure compensated drip emitter rotated 90 degrees about the lengthwise axis of the emitter. Enclosing pipe 201 is shown with holes 202 and 202*a* to provide exits for drip water. Pipe 201 is shown as a shaded cylindrical cut-away tube and may be formed of any material including but not limited to plastic. Embodiments of the invention may be inserted into pipe 201 using an extrusion process for example. The emitters may be inserted at fixed timing or fixed distance or any other displacement offset depending on the intended use for the implementation. For example, for a drip emitter system to be utilized for trees, the emitters may be introduced into pipe 201 at large intervals with respect to a drip emitter system for a garden having smaller plants.

FIG. 3 is a top view of an embodiment of the non-clogging non-pressure compensated drip emitter. As shown, water flows out of the page toward the reader from inwardly offset filter 120 through labyrinth entry 301 and 301*a* into labyrinth 140 and 140*a* respectively. Each labyrinth provides only turbulent transfer zones as the water for example travels toward the right in the labyrinth section closest to inwardly offset filter 120, bends at transfer zone location 141 and travels to labyrinth exit 142 into pool 130. In addition, water flows out of the page from inwardly offset filter 120 and enters labyrinth entry 301*a*, travels through labyrinth 140*a* and exits from exit 142*a* into pool 130*a*. From pool 130 water drips from the pipe at hole 202 (see FIG. 2) and from pool 130*a* to hole 202*a* respectively.

Figure 4:
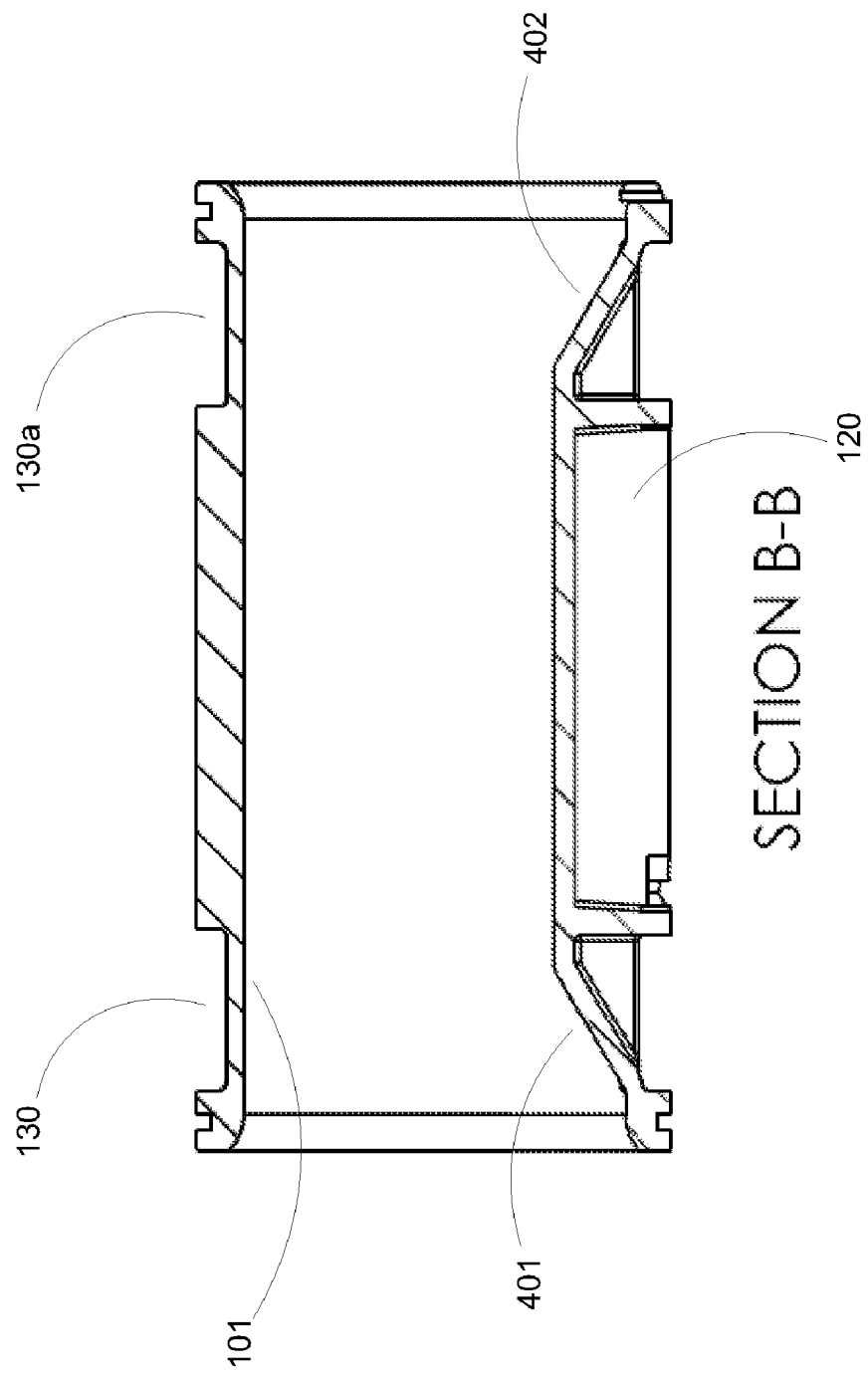
FIG. 4 is a side cross-section view of an embodiment of the non-clogging non-pressure compensated drip emitter.

FIG. 4 is a side cross-section view of an embodiment of the non-clogging non-pressure compensated drip emitter. Inwardly offset filter 120 can be streamlined with streamline ramp 401 and 402 for example. This also protects the emitter when the emitter is inserted into the extruding device and placed into a pipe for example by providing greater structural strength in inwardly offset filter 120.

Figure 5:
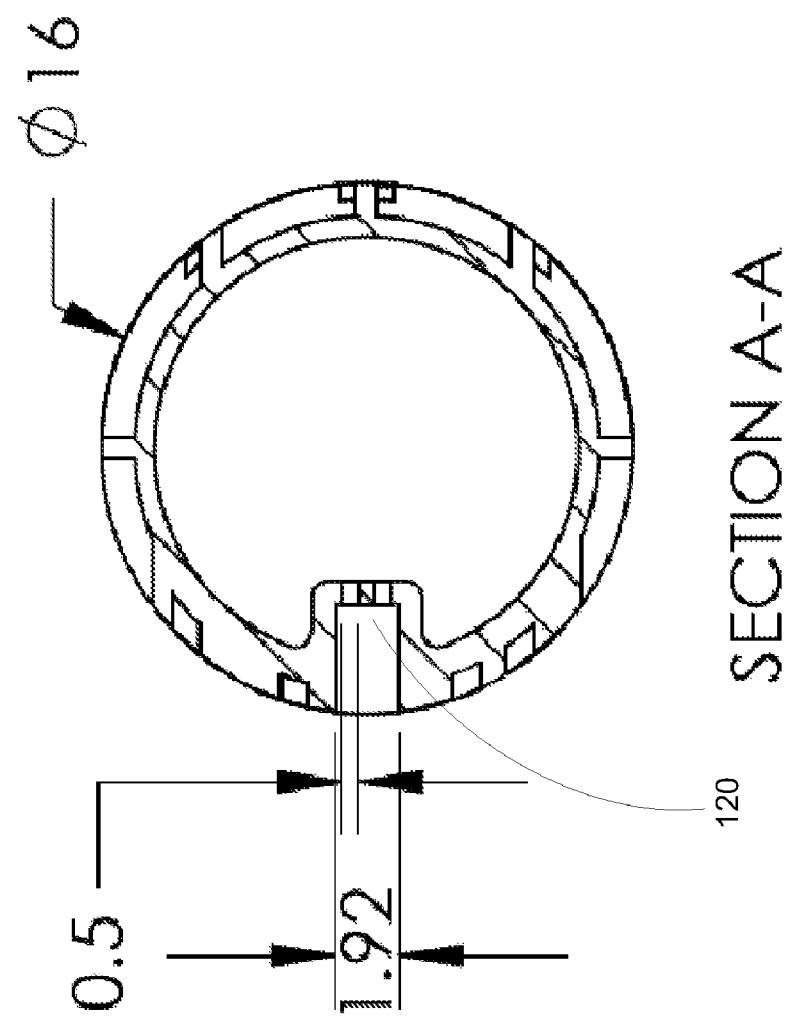
FIG. 5 is an end cross-section view of an embodiment of the non-clogging non-pressure compensated drip emitter.

FIG. 5 is an end cross-section view of an embodiment of the non-clogging non-pressure compensated drip emitter. As shown, the width of the inwardly offset filter is 1.92 mm, however any size may be utilized depending on the amount of water flow desired for example. In addition, the individual filter elements, i.e., holes in the filter, are shown as 0.5 mm in diameter. Any other size may be utilized to filter the desired particulate size based on the water condition of the destination installation for example. Any suitable material may be utilized for non-clogging non-pressure compensated drip emitter 100. For example, any material that may be injection molded may be utilized including but not limited to plastic or any other material so long as inwardly offset filter 120, labyrinth 140 and pool 130 may be formed and coupled together to allow water to flow through these components and out of an enclosing pipe.

Figure 6:
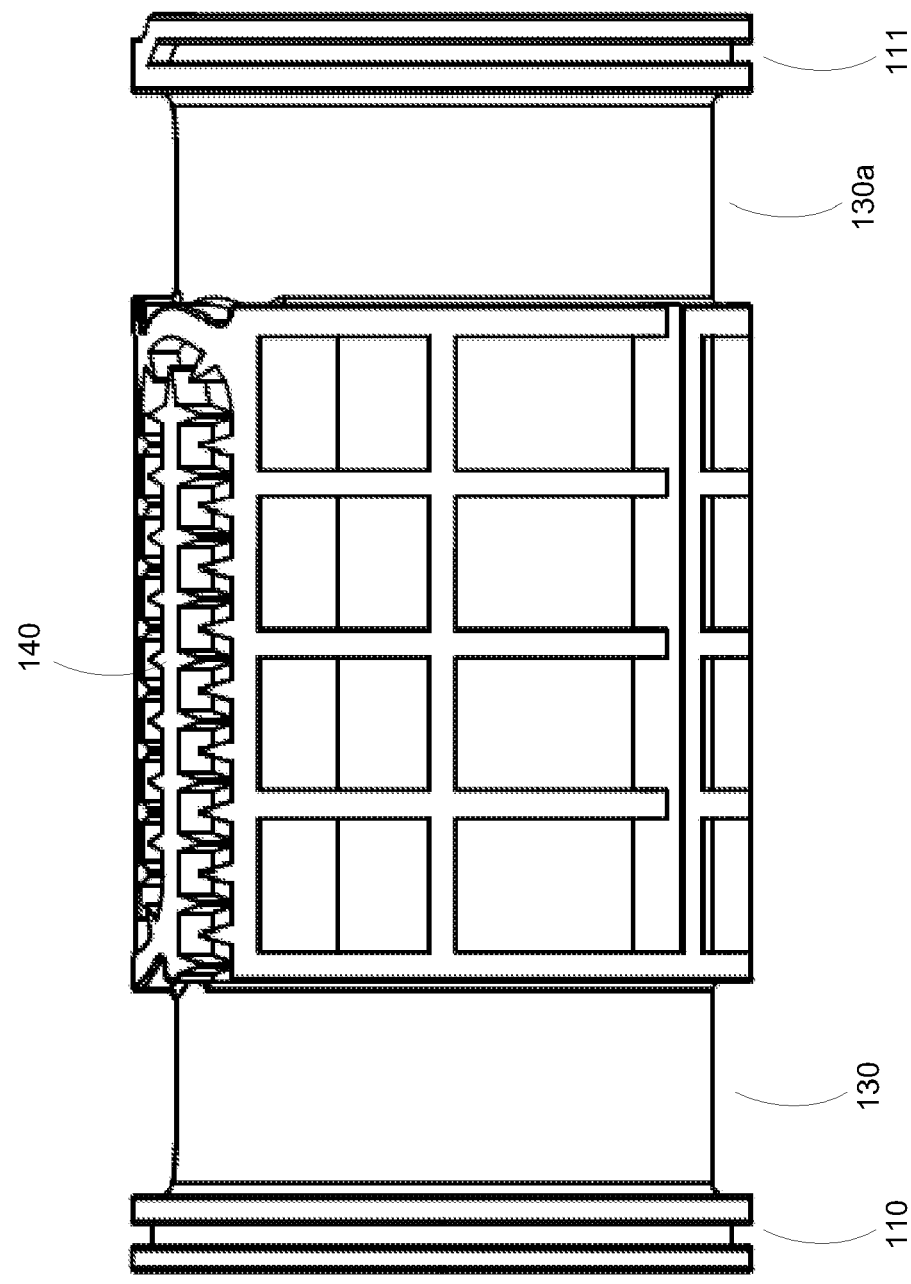
FIG. 6 is side view of an embodiment of the non-clogging non-pressure compensated drip emitter.

FIG. 6 is side view of an embodiment of the non-clogging non-pressure compensated drip emitter. The features on the top half point upwardly as this embodiment is this implementation is suited for a hemispherical mold with two halves. All features of the bottom half of the mold point downwardly and as such the mold can be pulled away from the emitter from above and below so as to leave the molded features including labyrinth 140. Any other number of injection mold parts may also be utilized in forming embodiments of the invention, including three or four injection mold parts for example. By avoiding transfers of water across mold boundaries, straight water paths, i.e., non-turbulent zones may be avoided in embodiments of the invention after water flows into the labyrinth were it is kept turbulent in one or more embodiments. In embodiments that utilize more than two mold parts, i.e., 3 or more mold parts, such as a quadrant mold, turbulent zones may be maintained across mold boundary but at higher cost of forming the parts.

Figure 7:
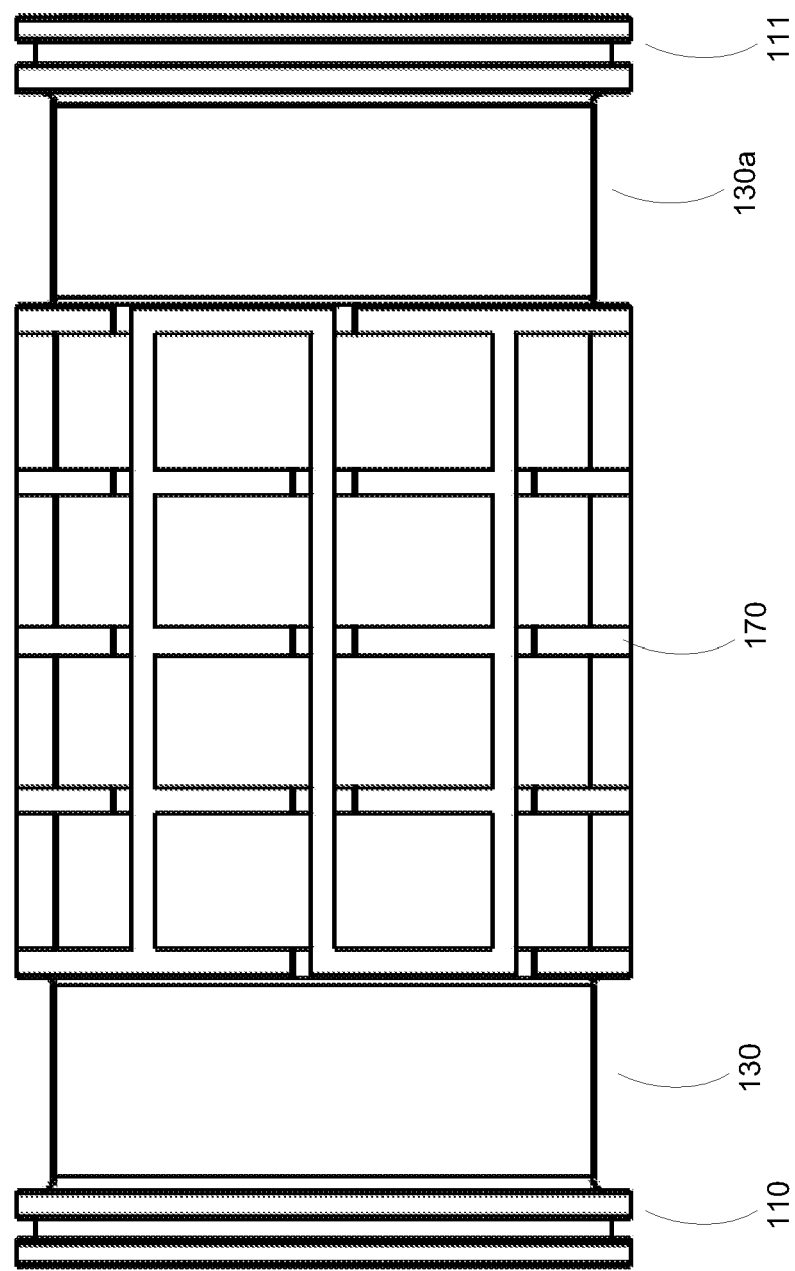
FIG. 7 is bottom view of an embodiment of the non-clogging non-pressure compensated drip emitter.

FIG. 7 is bottom view of an embodiment of the non-clogging non-pressure compensated drip emitter. Grid 170 may extend 180 degrees or more on the bottom of the emitter or may be replaced by another filter and double labyrinth configuration as per FIG. 3 for more redundant embodiments. As the pools 130 and 130a extend around the emitter, no matter where holes 202 or 202a are drilled, e.g., top, side or bottom radially, water travels from the inwardly offset filter 120 to the respective pool. Embodiments of the invention may be manufactured via die casting so that a portion of the labyrinth(s) and inwardly offset filter extend around the emitter 90 degrees or less for a four part die, i.e., quadrant mold, or 120 degrees or less for a three part die, or 180 degrees or less for a two part die. For redundancy, grid 170 may be replaced by the second third or fourth die portion by a redundant inwardly offset filter 120 and associated labyrinth(s). These multi-filter embodiments provide a high degree of redundancy and avoid clogging to a high degree. Molds for these redundant embodiments may be more expensive than embodiments that utilize grid sections, so depending on the requirements for the particular product implementation, redundant sections or non-redundant grid bearing sections may be utilized.

In addition, by limiting the radial portion of the emitter having inwardly offset filter(s) and labyrinth(s), laminar flow transfer zones are avoided. Laminar flow transfer zones tend to fill with suspended solids where turbulent flow does not exist. Hence forming inwardly offset filter(s) and labyrinth(s) that do not cross a mold boundary with a straight or non-turbulent transfer zone after water enters the labyrinth enables embodiments of the invention to avoid clogging. Embodiments that are configured with inwardly offset filter(s) and labyrinth(s) for example that do not cross a mold boundary are in keeping with the spirit of the invention.

Several embodiments of redundant configurations may be formed that include a two pool embodiment with one inwardly offset filter, one or more labyrinths, i.e., one labyrinth with a "T" or fork section, or two labyrinths, each flowing to a separate pool. As one skilled in the art will appreciate, mirroring labyrinth 140a to connect to the same side of the filter as labyrinth 140 and respectfully to exist to the same side of the emitter, i.e., to flow into the same pool as labyrinth 140 provides a one pool, two labyrinth embodiment. This embodiment may be considered a one pool, one labyrinth embodiment with a "T" section at the end of the filter where the labyrinth sides actually connect at that side of the filter. Alternatively, the embodiment can be doubled to form inwardly offset filters, for example offset rotationally by 180 degrees, with separate labyrinth(s) and pool(s) coupled therewith for even more redundancy. Any other variations that maintain turbulent transfer are in keeping with the spirit of the invention. In addition, any variation of the inwardly offset filter is in keeping with the spirit of the invention.

Figure 8:
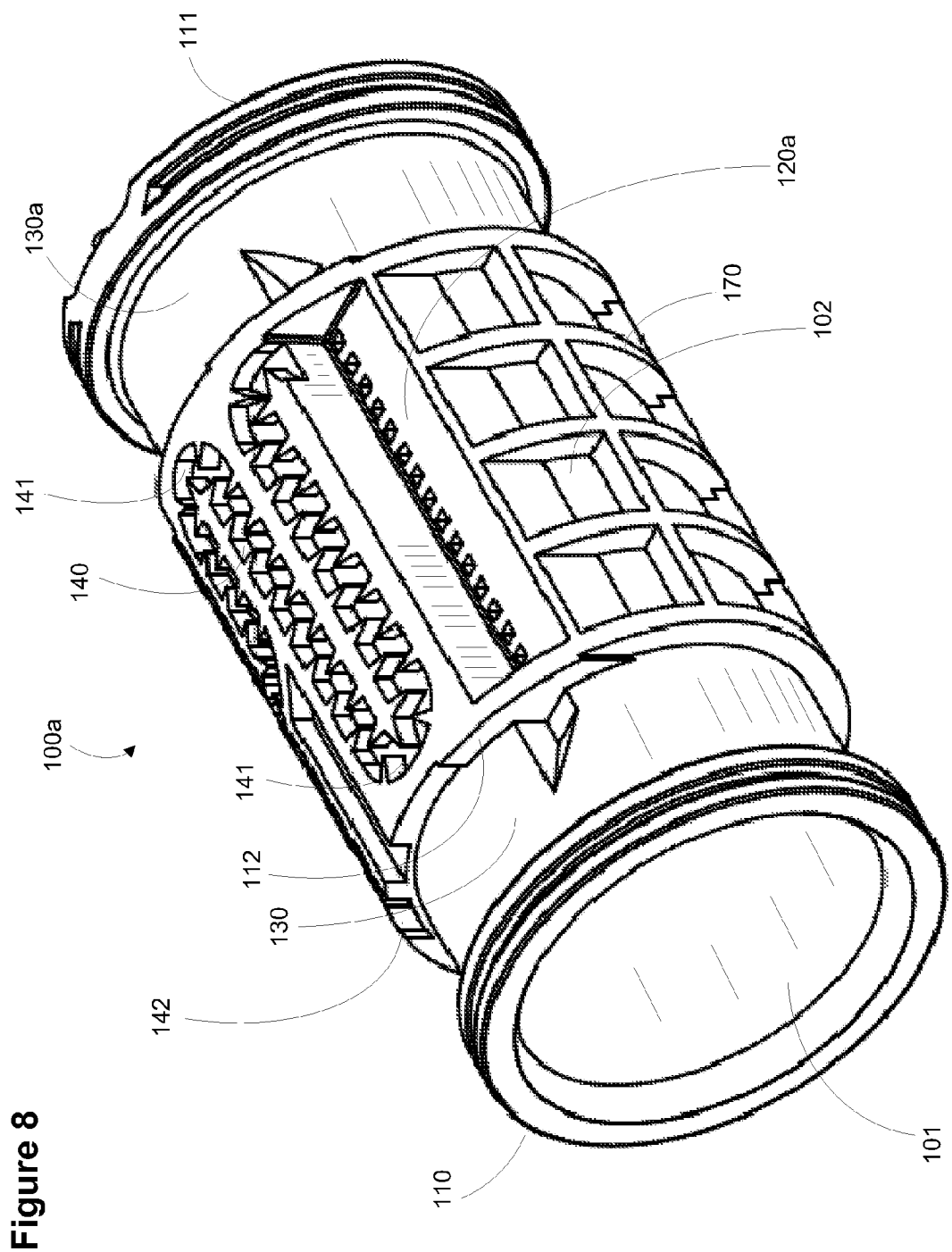
FIG. 8 is a perspective view of a second embodiment of the non-clogging non-pressure compensated drip emitter.

FIG. 8 is a perspective view of a second embodiment of the non-clogging non-pressure compensated drip emitter. In this embodiment inwardly offset filter 120a is formed offset from the center looking down onto the emitter and exits labyrinth 140 into pool 130 and 130a.

Figure 9:
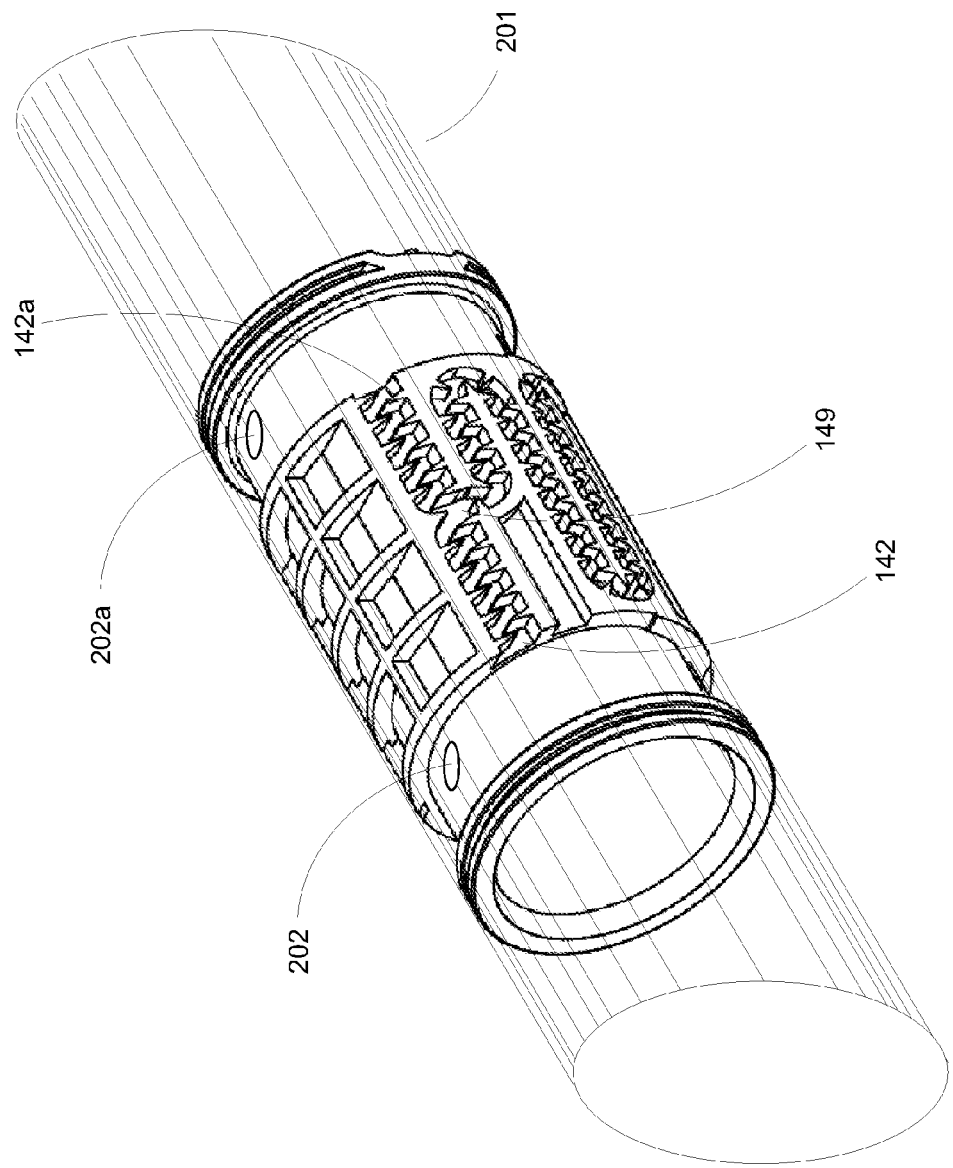
FIG. 9 is a perspective view of a second embodiment of the non-clogging non-pressure compensated drip emitter rotated 90 degrees about the lengthwise axis of the emitter and shown as situated inside a pipe or hose.

FIG. 9 is a perspective view of a second embodiment of the non-clogging non-pressure compensated drip emitter rotated 90 degrees about the lengthwise axis of the emitter and shown as situated inside pipe 201. In the figure, water flows through the labyrinth to fork 149 and exits the labyrinth at exit 142 and 142a and into the pools at each side of the emitter. Hence, this embodiment uses one labyrinth to supply two pools from one labyrinth entry point.

Figure 10:
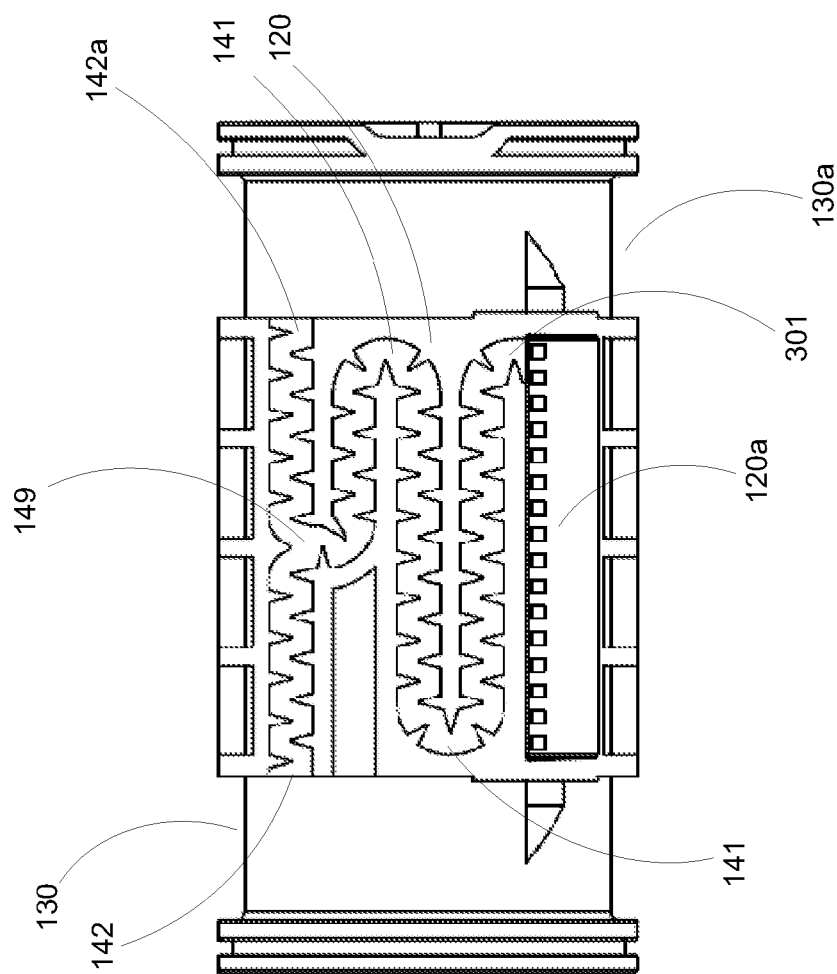
FIG. 10 is a top view of a second embodiment of the non-clogging non-pressure compensated drip emitter.

FIG. 10 is a top view of a second embodiment of the non-clogging non-pressure compensated drip emitter. In this figure, exits 142 and 142a are shown on each side of fork 149, which is a turbulent area so as to avoid clogging. There are two transfer zone locations 141 shown at the bends in the labyrinth on the lower left of the labyrinth and on the middle right of the labyrinth. The labyrinth is fed by a single labyrinth entry 301 in this embodiment. As shown in the figure all lines extend vertically down into the page so as to allow for a single side of an injection mold to form the features.

Figure 11:
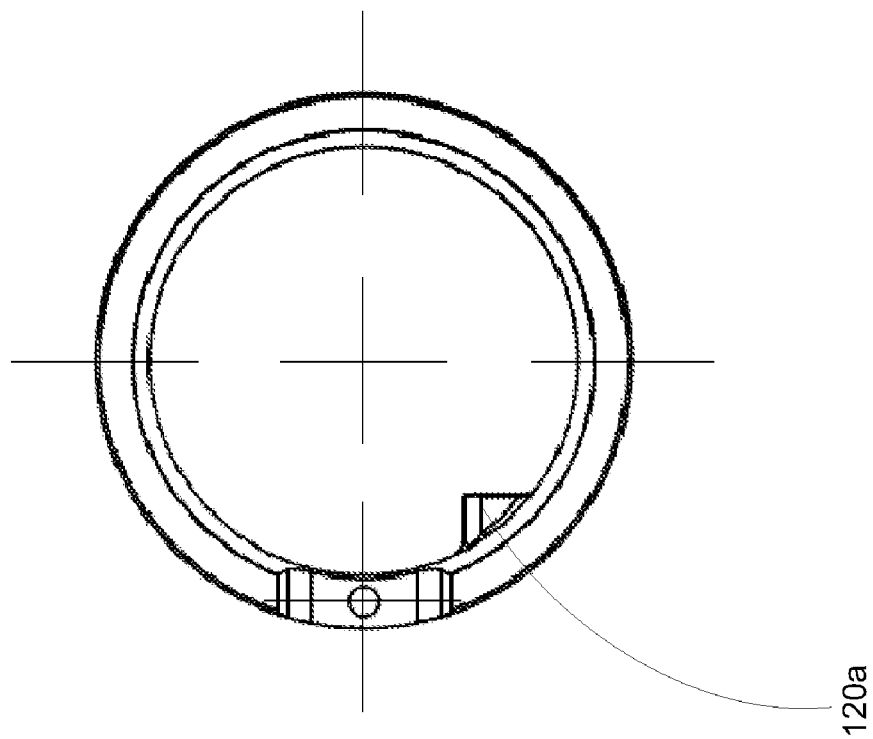
FIG. 11 is an end view of a second embodiment of the non-clogging non-pressure compensated drip emitter.

FIG. 11 is an end view of a second embodiment of the non-clogging non-pressure compensated drip emitter. In this embodiment the inwardly offset filter 120a is shown as offset into the inner portion of the emitter and offset down from the center of the nine o'clock position.

Figure 12:
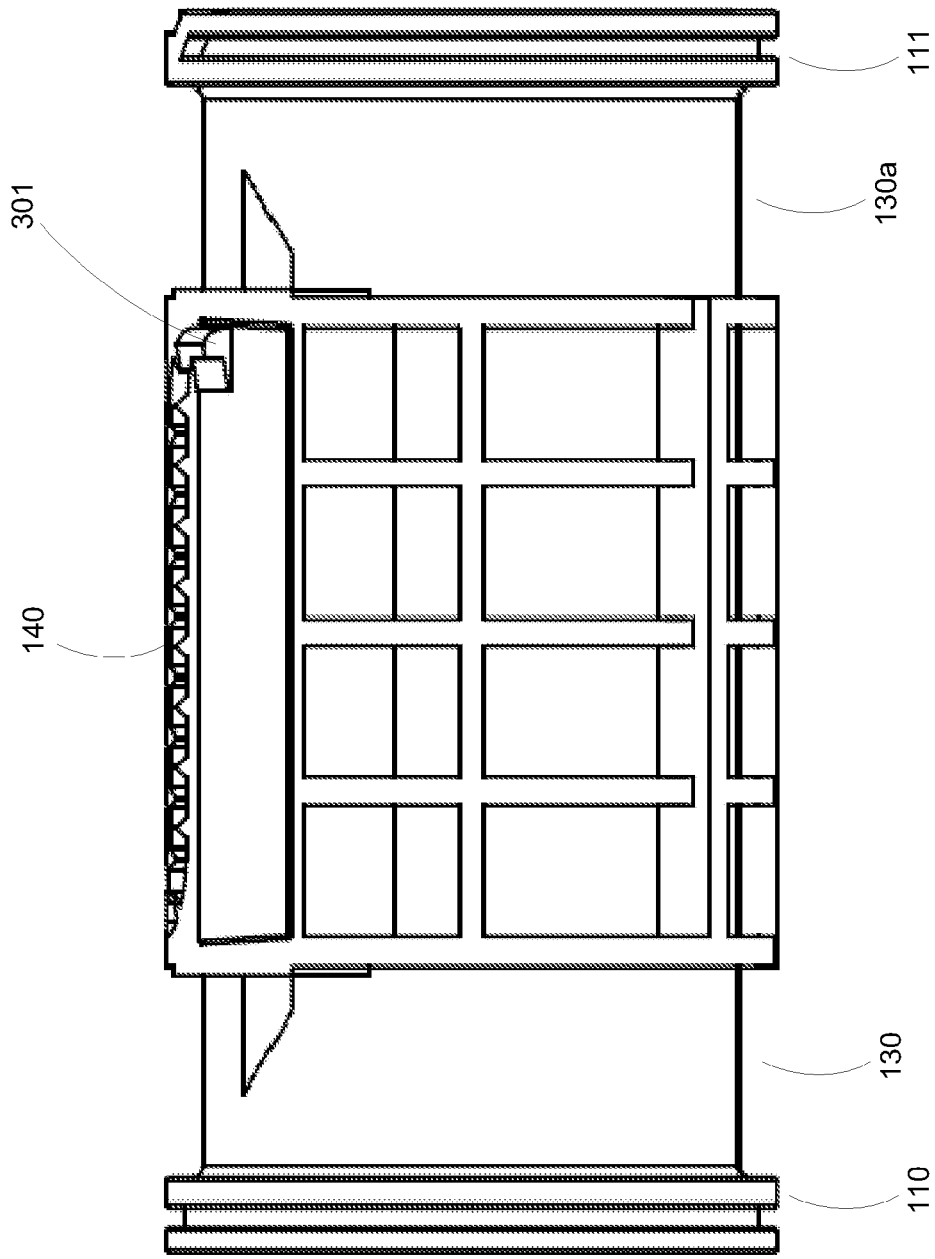
FIG. 12 is side view of a second embodiment of the non-clogging non-pressure compensated drip emitter.

FIG. 12 is side view of a second embodiment of the non-clogging non-pressure compensated drip emitter. Labyrinth entry 301 is shown opening into labyrinth 140 which feeds both pools 130 and 130a.

Figure 13:
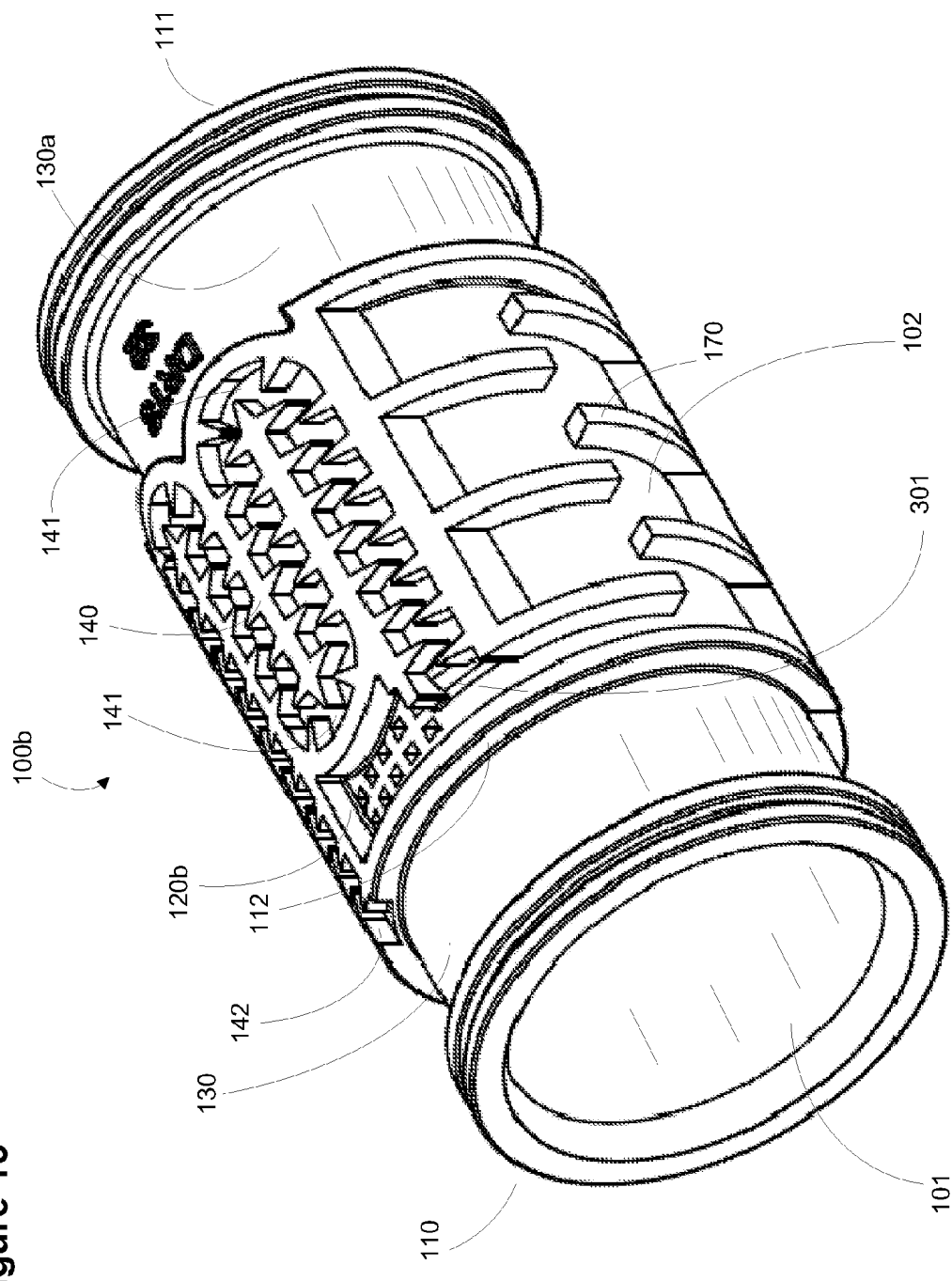
FIG. 13 is a perspective view of a third embodiment of the non-clogging non-pressure compensated drip emitter.

FIG. 13 is a perspective view of a third embodiment of the non-clogging non-pressure compensated drip emitter. In this embodiment, redundant filters 120b are situated on the top (as shown) and on the bottom of the filter (see FIG. 14). Each filter 120b leads through a respective labyrinth 140, via labyrinth entry 301, through multiple transfer zone locations 141, to labyrinth exit 142 and into a respective pool (top filter flows into pool 130, while bottom filter flows into pool 130a). The remaining reference characters are as shown in the previous embodiments.

Figure 14:
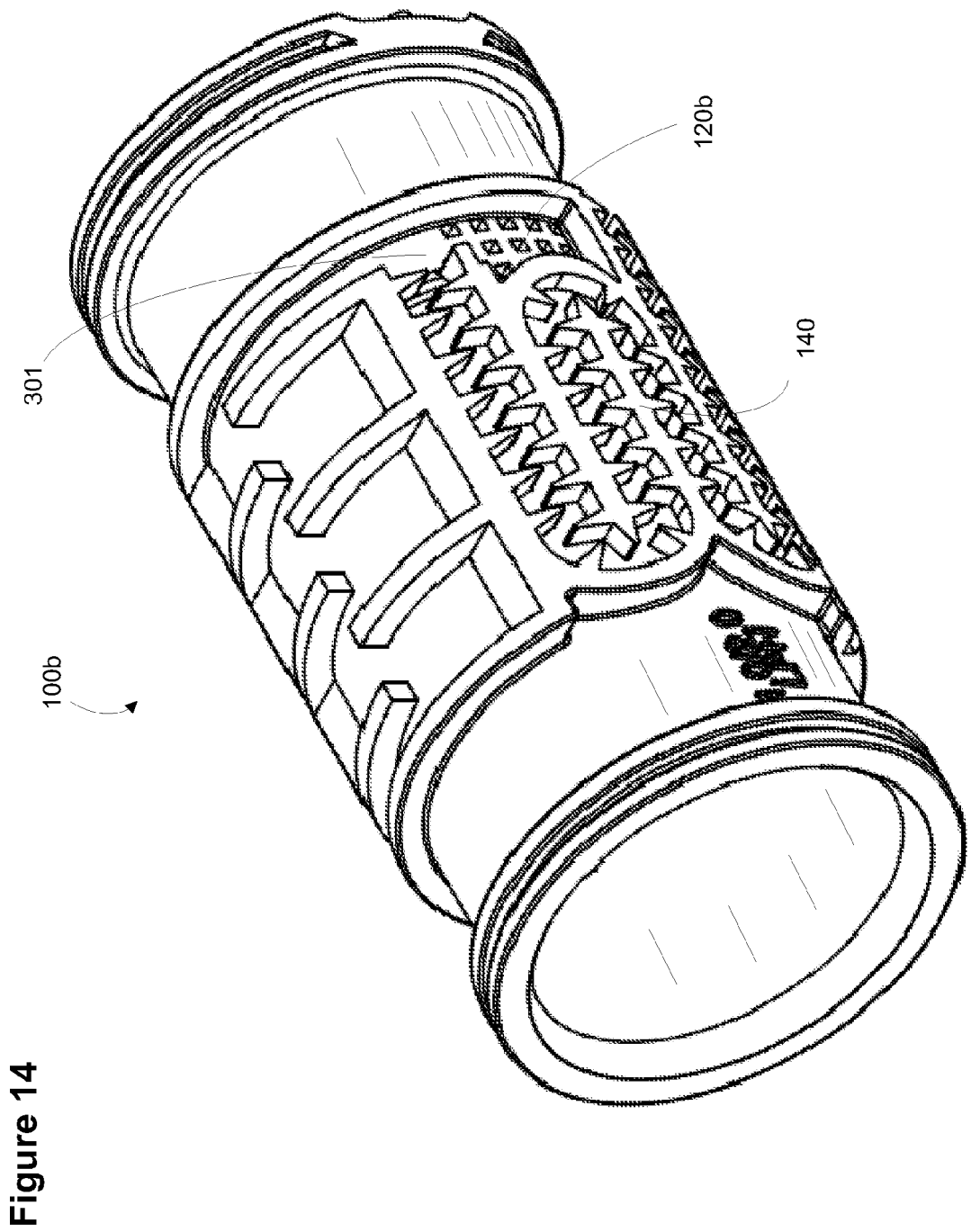
FIG. 14 is a perspective view of a third embodiment of the non-clogging non-pressure compensated drip emitter rotated 90 degrees about the lengthwise axis of the emitter.

FIG. 14 is a perspective view of a third embodiment of the non-clogging non-pressure compensated drip emitter rotated 90 degrees about the lengthwise axis of the emitter. In this figure the redundant filter 120b is shown mirrored onto the right side of the figure (as opposed to the left side mirror location of filter 120b in FIG. 13). In addition, filter 120b filters water that flows into labyrinth entry 301, through labyrinth 140 and into the right side pool.

Figure 15:
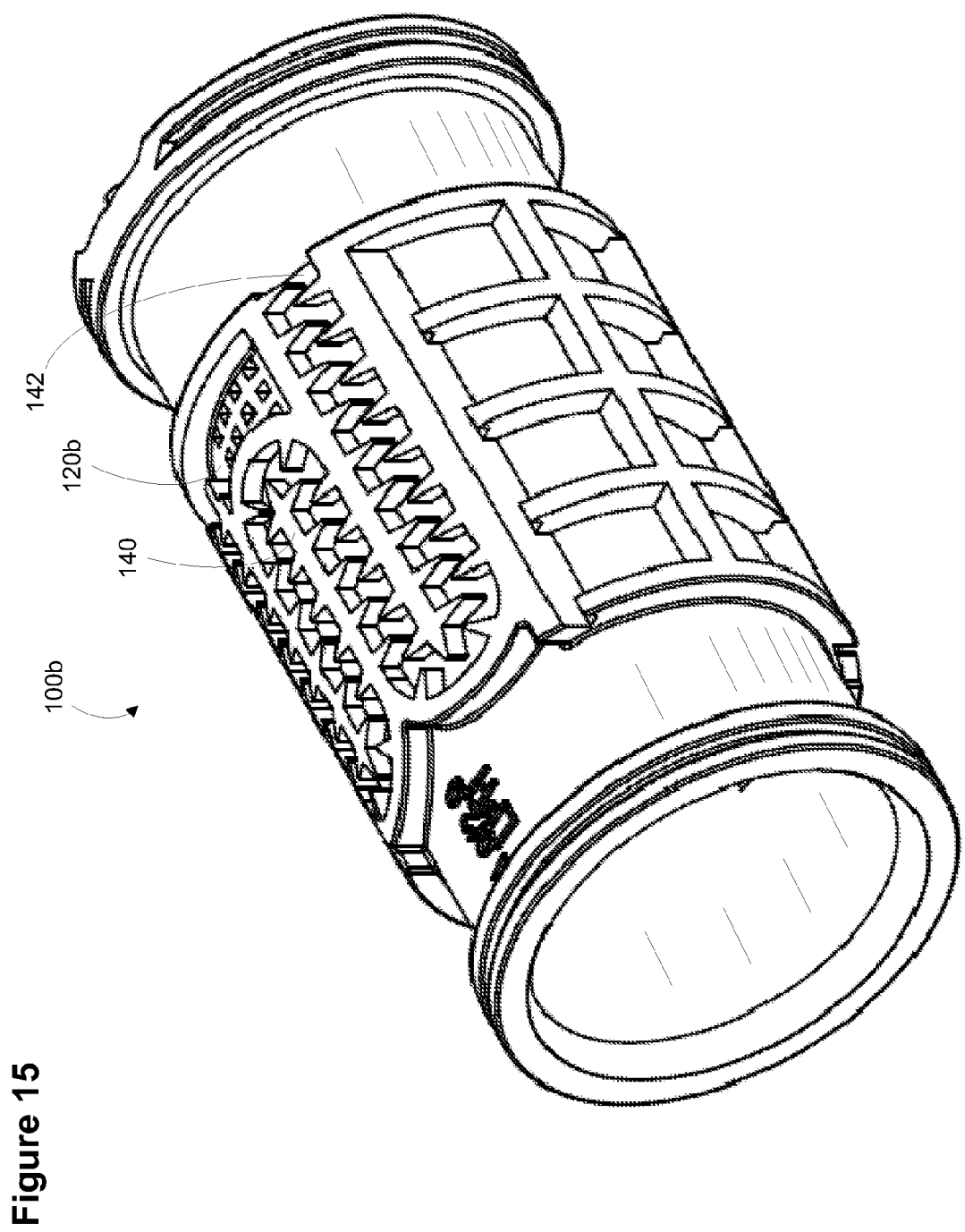
FIG. 15 is a perspective view of a third embodiment of the non-clogging non-pressure compensated drip emitter rotated 180 degrees about the lengthwise axis of the emitter.

FIG. 15 is a perspective view of a third embodiment of the non-clogging non-pressure compensated drip emitter rotated 180 degrees about the lengthwise axis of the emitter. Labyrinth exit 142 is visible in the further rotated view of FIG. 14 wherein labyrinth exit 142 allows the water to flow into the rightmost pool when the embodiment is enclosed in a pipe for example as shown in FIGS. 2 and 9 for the respective embodiments.

Figure 16:
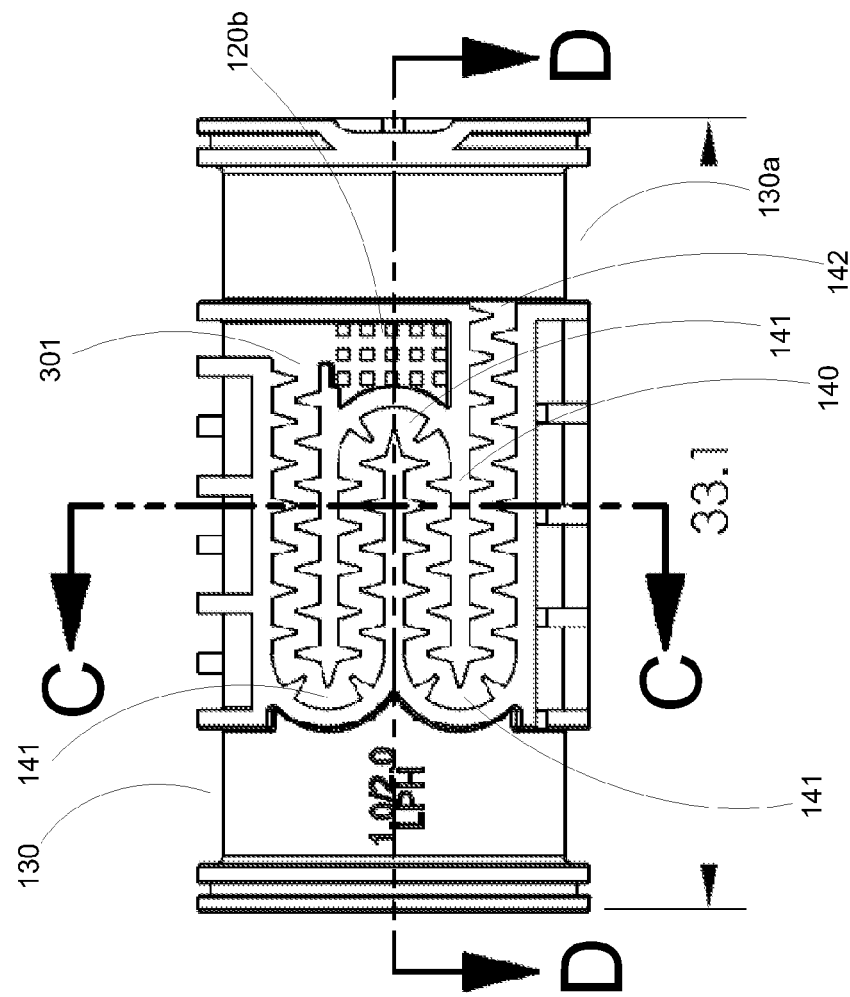
FIG. 16 is a top view of a third embodiment of the non-clogging non-pressure compensated drip emitter.

FIG. 16 is a top view of a third embodiment of the non-clogging non-pressure compensated drip emitter. As shown, water flows further through labyrinth 140 in this embodiment, which in some circumstances allows for a more controllable volume output with respect to shorter labyrinths. Through use of transfer zone locations 141 on switchbacks or turns, turbulent flow is thus maintained. As shown in this figure, pool 130a is filled when water flows through the emitter.

Figure 17:
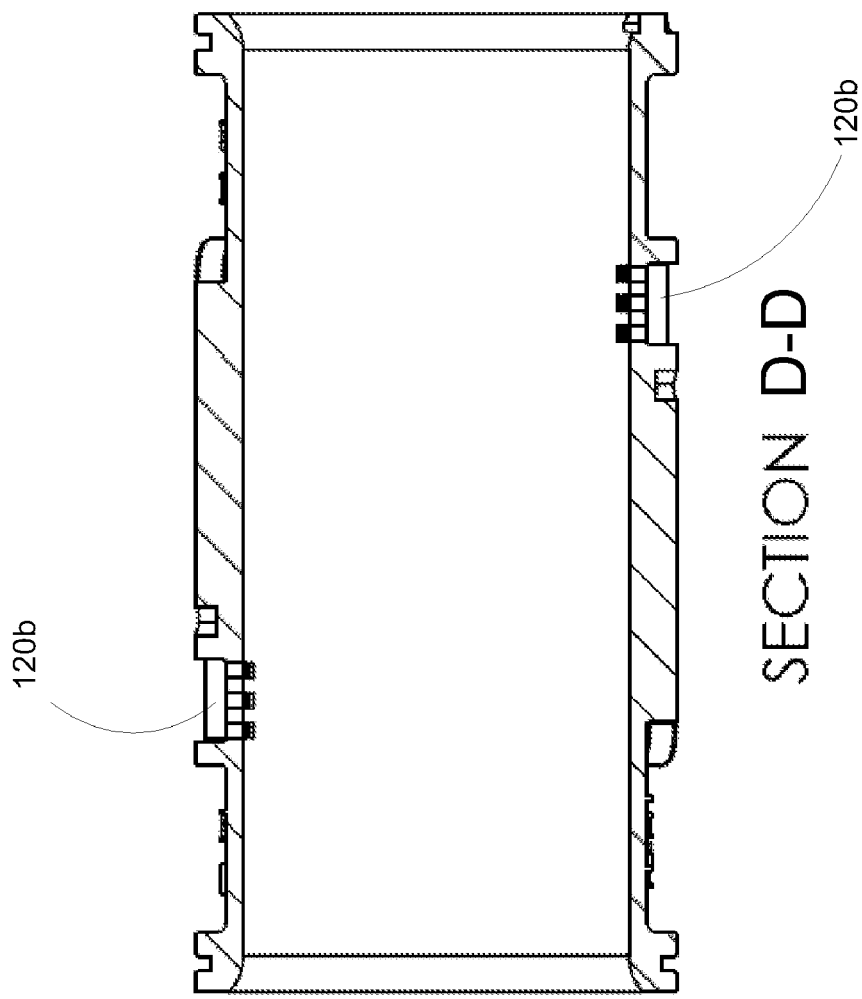
FIG. 17 is a side cross-section view of a third embodiment of the non-clogging non-pressure compensated drip emitter.

FIG. 17 is a side cross-section view of a third embodiment of the non-clogging non-pressure compensated drip emitter. Filter 120b on the top and mirrored bottom section can be seen on the upper left and lower right of the emitter respectively. As shown, a non-inwardly offset filter pair is utilized to provide redundancy in case one filter clogs. Alternatively, one or more inwardly offset filters may be utilized as well.

Figure 18:
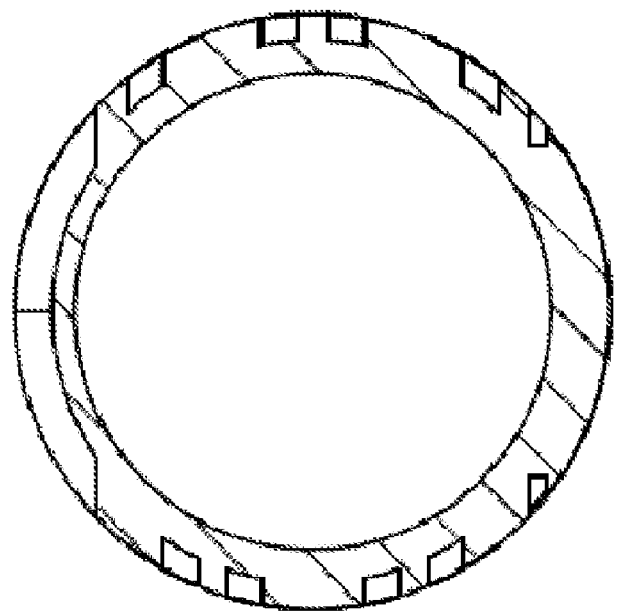
FIG. 18 is an end cross-section view of a third embodiment of the non-clogging non-pressure compensated drip emitter.

FIG. 18 is an end cross-section view of a third embodiment of the non-clogging non-pressure compensated drip emitter. In this embodiment, a flat filter (i.e., one without a depth offset toward the center of the emitter) may be used as shown since there will generally be at least one of the two 180 degree offset filters that are not pointing down and hence which will not collect sediment. Alternatively, the same inwardly offset filter of the first two embodiments can be utilized for one or both of filters 120b.

Figure 19:
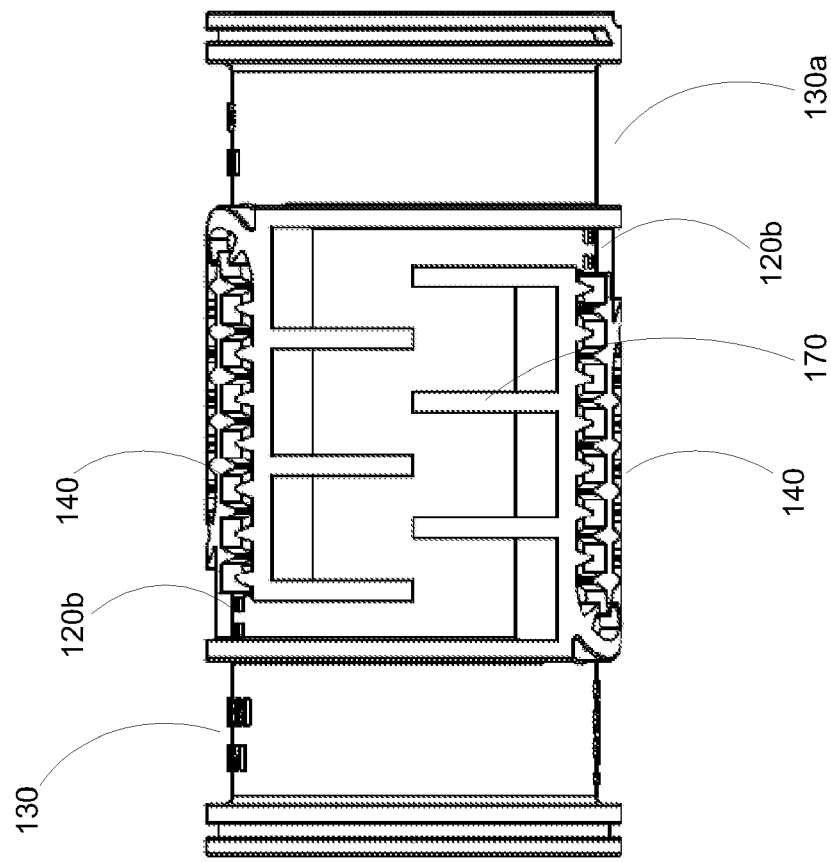
FIG. 19 is a side view of a third embodiment of the non-clogging non-pressure compensated drip emitter.

FIG. 19 is a side view of a third embodiment of the non-clogging non-pressure compensated drip emitter. In this figure, grid 170 is shown as not connected so that water can flow between the two filters and hence to both respectively labyrinth entries readily, in case for example one filter clogs.

Figure 20:
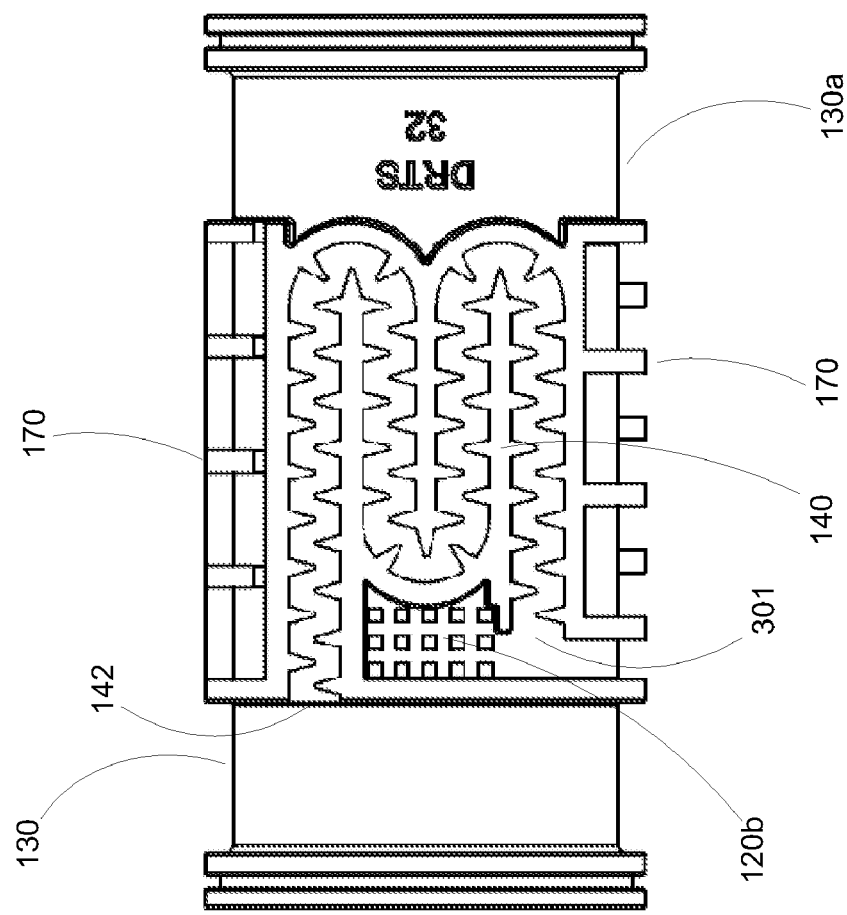
FIG. 20 is bottom view of a third embodiment of the non-clogging non-pressure compensated drip emitter.

FIG. 20 is bottom view of a third embodiment of the non-clogging non-pressure compensated drip emitter. This figure shows the outflow of labyrinth exit 142 into pool 130 (as opposed to FIG. 16 which shows the mirrored flow into pool 130a).

Figure 21:
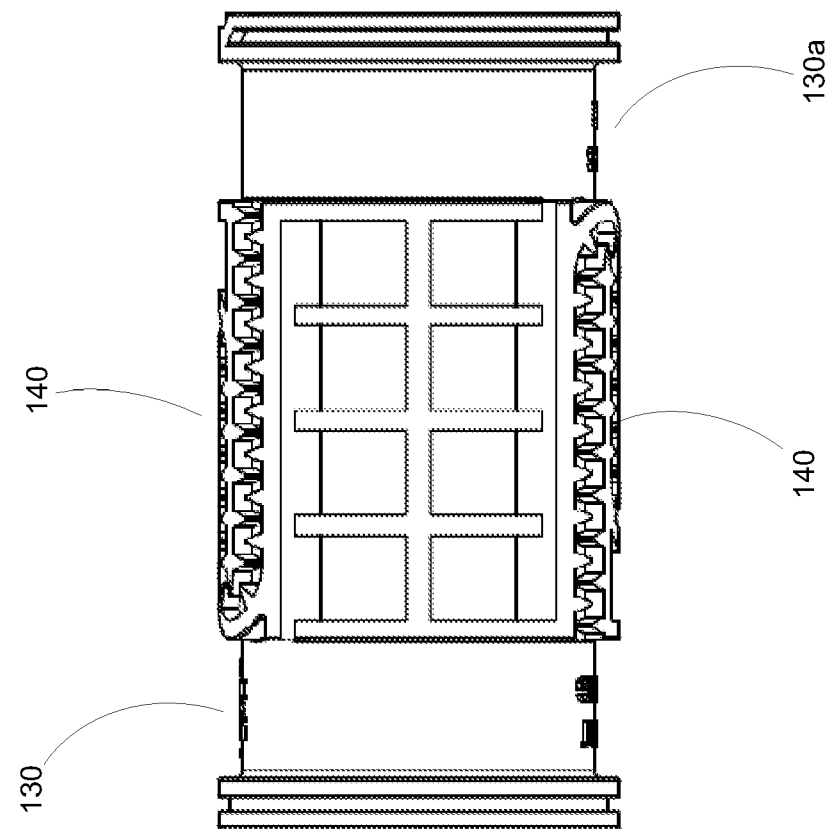
FIG. 21 is a reverse side view of a third embodiment of the non-clogging non-pressure compensated drip emitter.

FIG. 21 is a reverse side view of a third embodiment of the non-clogging non-pressure compensated drip emitter. This figure shows labyrinths 140 offset by 180 degrees on each side of the emitter.

Figure 22:
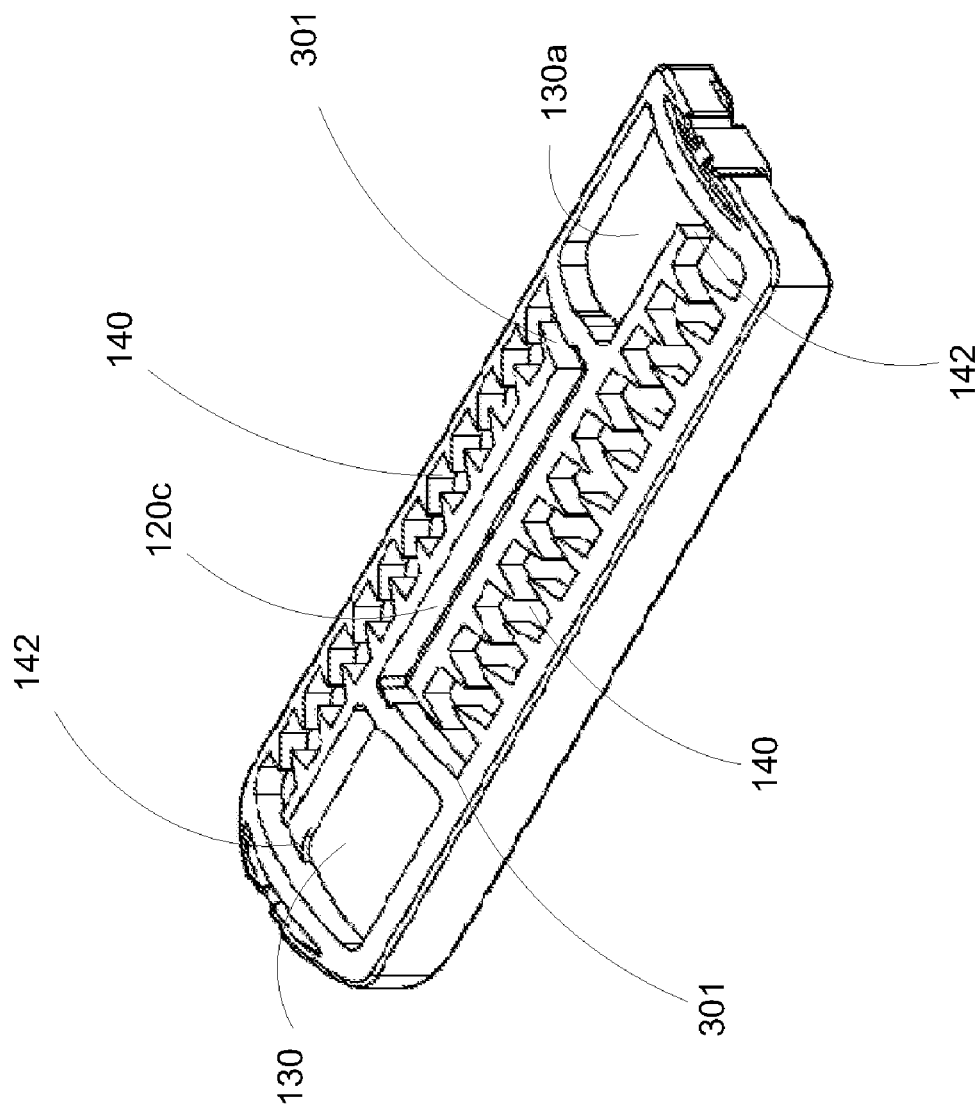
FIG. 22 is a perspective view of a fourth embodiment of the non-clogging non-pressure compensated drip emitter.

FIG. 22 is a perspective view of a fourth embodiment of the non-clogging non-pressure compensated drip emitter. In this embodiment filter 120c may be inwardly offset or flat with respect to the inner surface (underside as shown in the figure) of the emitter. This emitter may be placed inside a mount that is further located into a pipe or mounted with the top as shown in the figure directly against the inside of a pipe. Alternatively, more than one emitter may be mounted on a common mount and then placed inside a pipe to provide a radially redundant emitter. In this embodiment, filter 120c leads to mirrored labyrinths 140 via labyrinth entries 301 that allow water to flow into pools 130 and 130a respectively via labyrinth exits 142.

Figure 26:
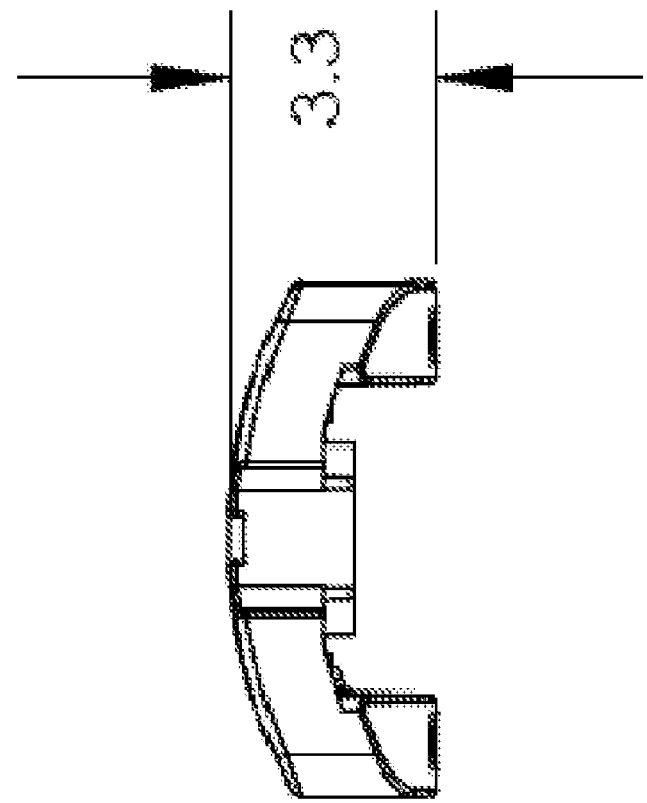
FIG. 26 is end view of a fourth embodiment of the non-clogging non-pressure compensated drip emitter.

This embodiment is also a cylindrical embodiment as are the first three embodiments, however the arc of the cylinder formed by the top surface as shown is less than 360 degrees as shown in the first three embodiments of FIGS. 1-21, (the partial arc is also shown as the top surface in FIG. 26). In other words, taking a hollow cylinder and looking down the barrel of the cylinder, this embodiment does not wrap completely in a circle while the first three embodiments are fully cylindrical about the center axis that runs parallel to the cylinder.

Figure 23:
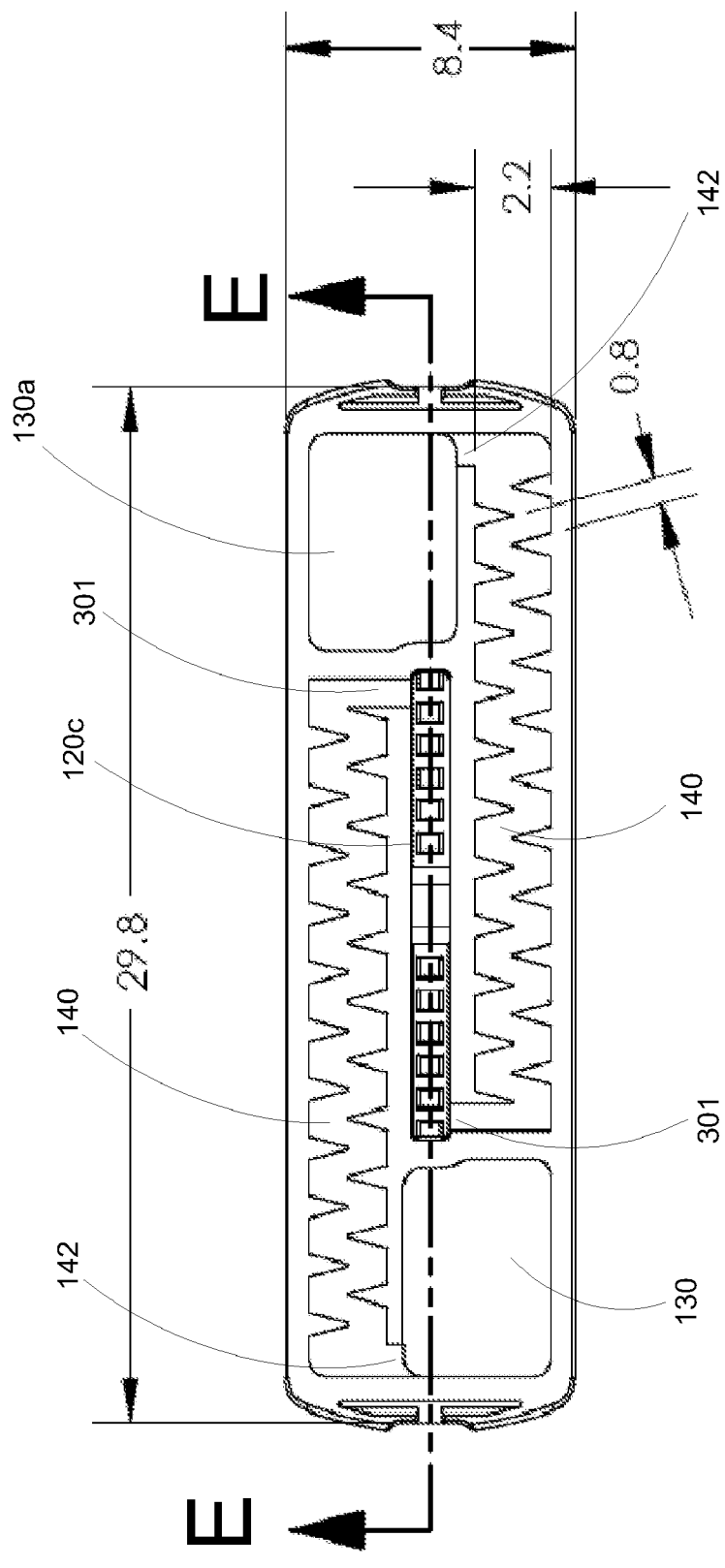
FIG. 23 is a top view of a fourth embodiment of the non-clogging non-pressure compensated drip emitter.

FIG. 23 is a top view of a fourth embodiment of the non-clogging non-pressure compensated drip emitter. As shown, if one side of the emitter clogs, the other side of the emitter still operates.

Figure 24:
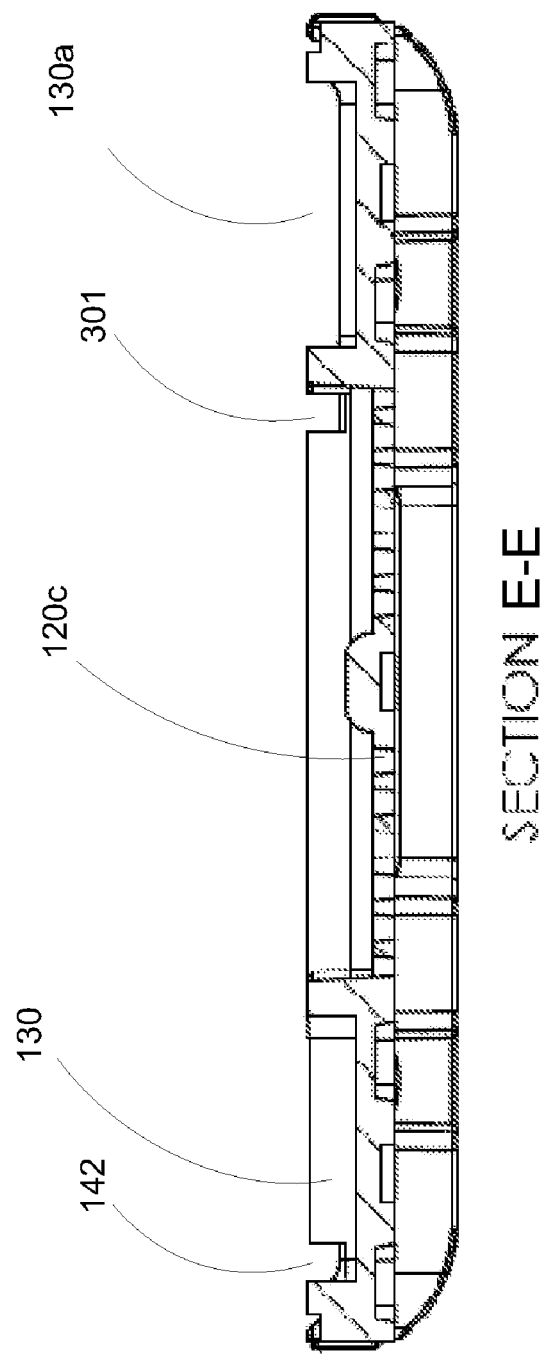
FIG. 24 is a side cross-section view of a fourth embodiment of the non-clogging non-pressure compensated drip emitter.

FIG. 24 is a side cross-section view of a fourth embodiment of the non-clogging non-pressure compensated drip emitter. Labyrinth entry 301 and labyrinth exit 142 are shown vertically displaced to provide a water path when the emitter is placed inside a pipe.

Figure 25:
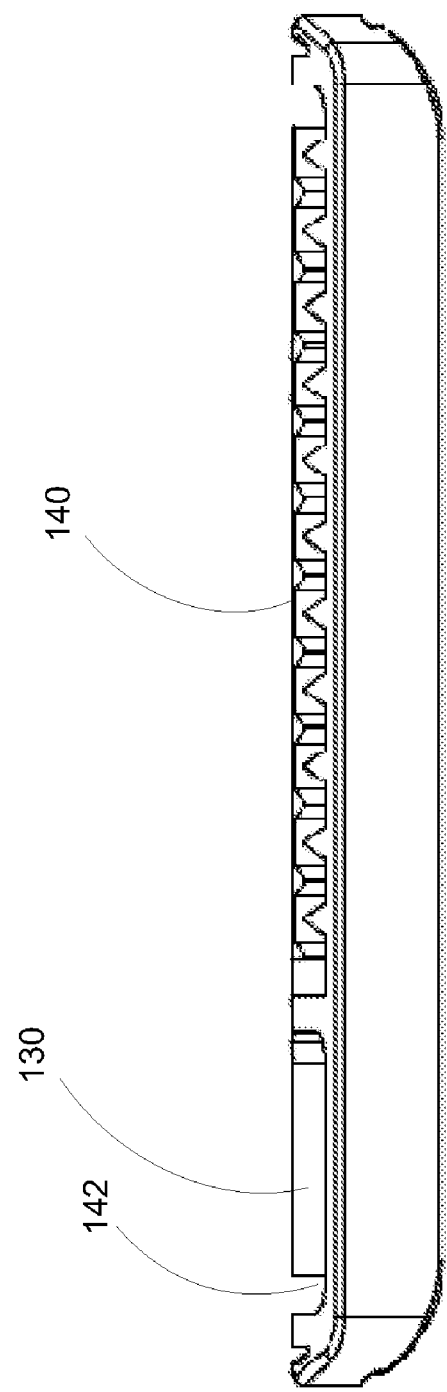
FIG. 25 is a side view of a fourth embodiment of the non-clogging non-pressure compensated drip emitter.

FIG. 25 is a side view of a fourth embodiment of the non-clogging non-pressure compensated drip emitter. Pool 130 is shown as fed by labyrinth exit 142.

FIG. 26 is end view of a fourth embodiment of the non-clogging non-pressure compensated drip emitter. In this view an example thickness is shown for an embodiment of the device.

Figure 27:
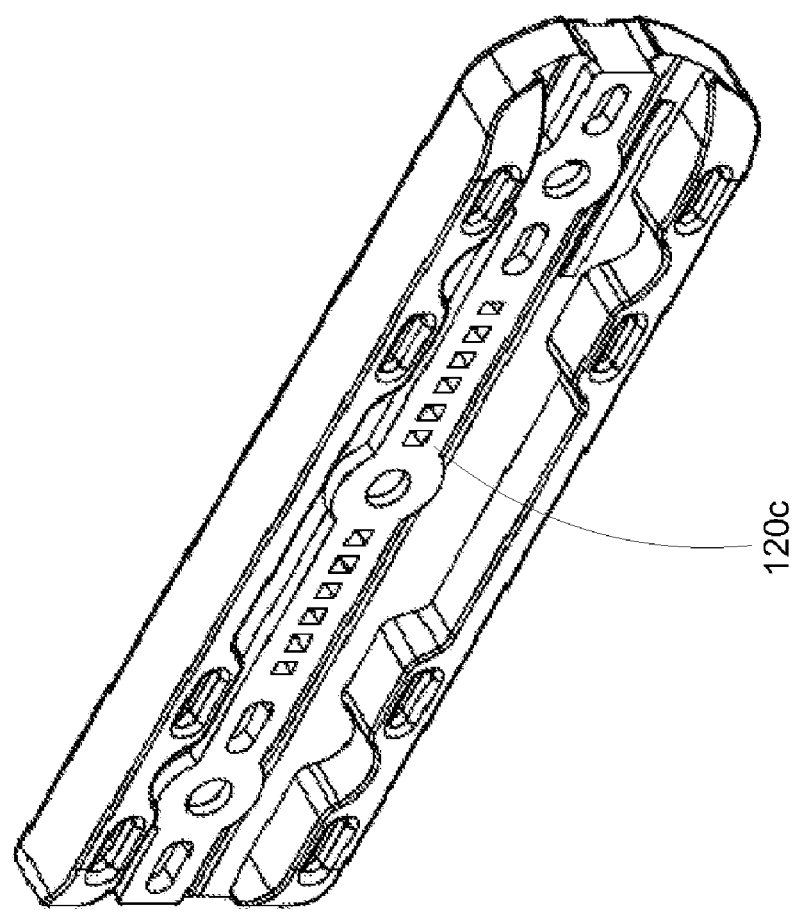
FIG. 27 is a bottom perspective view of a fourth embodiment of the non-clogging non-pressure compensated drip emitter.

FIG. 27 is a bottom perspective view of a fourth embodiment of the non-clogging non-pressure compensated drip emitter. In this figure, filter 120c is shown with several filter holes offset from one another. This embodiment may also utilize an inwardly offset filter if so desired, which is constructed with a thickness greater than the remaining portions of the emitter to provide an offset further away from the pipe (i.e., closer to the centerline of the pipe).

Figure 28:
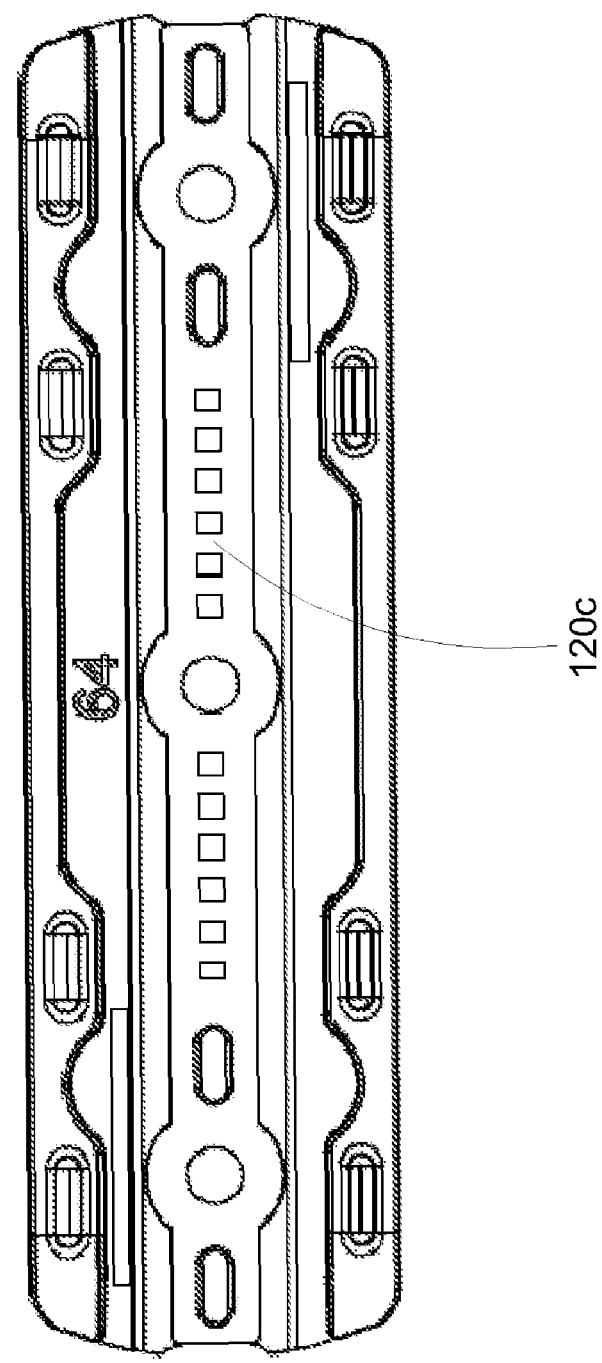
FIG. 28 is a bottom view of a fourth embodiment of the non-clogging non-pressure compensated drip emitter.

FIG. 28 is a bottom view of a fourth embodiment of the non-clogging non-pressure compensated drip emitter. Any number of holes may be utilized in the filter depending on the expected sediment size for example.

While the invention herein disclosed has been described by means of specific embodiments and applications thereof, numerous modifications and variations could be made thereto by those skilled in the art without departing from the scope of the invention set forth in the claims.

What is claimed is:

1. A non-clogging non-pressure compensated drip emitter comprising:
   a hollow cylindrical emitter body having an inner cylindrical surface, an outer cylindrical surface, a first end and a second end;
   a filter;
   a pool coupled with the outer cylindrical surface wherein the pool is configured to hold water filtered by the filter when the hollow cylindrical emitter body is enclosed in a pipe; and,
   a labyrinth that defines a water flow path through said drip emitter wherein said labyrinth is coupled with the outer cylindrical surface of said hollow cylindrical emitter body and wherein the labyrinth comprises only turbulent transfer zones once water enters the labyrinth and wherein the labyrinth allows the water to flow from the filter to the pool and wherein said labyrinth starts at said filter and ends at said pool wherein said labyrinth comprises teeth that each have a furthest projection that projects perpendicularly a first distance approximately halfway across said water flow path from a first sidewall of said labyrinth to an opposing sidewall of said labyrinth and wherein said furthest projection of each tooth of said teeth is located along said water flow path at a second distance to at least one other furthest projection of another tooth and wherein said first distance is approximately equal to said second distance.

2. The non-clogging non-pressure compensated drip emitter of claim 1 wherein the filter is inwardly offset and projects inwardly from the inner cylindrical surface of the hollow cylindrical emitter body.

3. The non-clogging non-pressure compensated drip emitter of claim 1 wherein the filter is aligned lengthwise parallel to the hollow cylindrical emitter body.

4. The non-clogging non-pressure compensated drip emitter of claim 1 comprising:
   a second pool coupled with the outer cylindrical surface wherein the second pool is configured to hold water filtered by the filter when the hollow cylindrical emitter body is enclosed in the pipe.

5. The non-clogging non-pressure compensated drip emitter of claim 4 wherein the labyrinth includes a fork and is configured to provide water to the pool and second pool.

6. The non-clogging non-pressure compensated drip emitter of claim 1 comprising:
   a second labyrinth coupled with the outer cylindrical surface wherein the second labyrinth comprises only turbulent transfer zones once water enters the labyrinth and wherein the second labyrinth allows the water to flow from the filter to the pool and wherein said second labyrinth starts at said filter and ends at said pool.

7. The non-clogging non-pressure compensated drip emitter of claim 1 comprising:
a first wall that extends outwardly from the outer cylindrical surface of the hollow cylindrical emitter body on the first end of the hollow cylindrical emitter body wherein the first wall is configured to form a side of the pool.

8. The non-clogging non-pressure compensated drip emitter of claim 1 wherein the labyrinth extends outwardly from the outer cylindrical surface and is sealed when enclosed by the pipe.

* * * * *